United States Patent
Ben Henda et al.

(10) Patent No.: US 12,200,491 B2
(45) Date of Patent: Jan. 14, 2025

(54) NON-ORTHOGONAL SIGNALING FOR RADIO ACCESS NETWORKS

(71) Applicant: Telefonaktiebolaget LM Ericsson (publ), Stockholm (SE)

(72) Inventors: Noamen Ben Henda, Stockholm (SE); Peter Hedman, Helsingborg (SE); Paul Schliwa-Bertling, Ljungsbro (SE); Monica Wifvesson, Lund (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 106 days.

(21) Appl. No.: 16/619,268

(22) PCT Filed: May 4, 2019

(86) PCT No.: PCT/EP2019/058622
§ 371 (c)(1),
(2) Date: Dec. 4, 2019

(87) PCT Pub. No.: WO2019/193147
PCT Pub. Date: Oct. 10, 2019

(65) Prior Publication Data
US 2024/0284178 A1 Aug. 22, 2024

Related U.S. Application Data

(60) Provisional application No. 62/653,794, filed on Apr. 6, 2018.

(51) Int. Cl.
*H04W 12/102* (2021.01)
*H04W 76/10* (2018.01)
(Continued)

(52) U.S. Cl.
CPC ......... *H04W 12/102* (2021.01); *H04W 76/10* (2018.02); *H04W 76/30* (2018.02); *H04W 92/10* (2013.01)

(58) Field of Classification Search
CPC ............. H04W 12/106; H04W 12/033; H04W 28/0268; H04W 8/22; H04W 12/02;
(Continued)

(56) References Cited

U.S. PATENT DOCUMENTS 11,606,682 B2 * 3/2023 Ben Henda ............. H04W 8/08
2011/0188408 A1 8/2011 Yi et al.
(Continued)

FOREIGN PATENT DOCUMENTS

AU 2019249939 B2 10/2019
CN 105557062 A 5/2016
(Continued)

OTHER PUBLICATIONS

ZTE, "Guarantee the UE Max Data Rate for Integrity Protection", 3GPP TSG-RAN WG3 #99bis. R3-181691, Apr. 16-20, 2018, Sanya, China.
ZTE Corporation, 51342362A1, Consideration of UP Integrity Configuration, 3GPP TSG-RAN WG2 Meeting #99bis, R2-1710314, Prague, Czech Republic, Oct. 9-13, 2017, 3 pages.
(Continued)

*Primary Examiner* — Matthew C Sams
(74) *Attorney, Agent, or Firm* — Sage Patent Group

(57) ABSTRACT

A method to operate a UE for handling security policy for user plane protection of communications in a communications system is provided. The method includes transmitting a packet data unit (PDU) session establishment request network access stratum (NAS) message toward an Access and Mobility Management Function (AMF) to establish a PDU session. The method further includes receiving an access network (AN) specific resource setup message indicating whether the UE is to activate integrity protection for data radio bearers (DRBs) serving the PDU session.

14 Claims, 17 Drawing Sheets

(51) Int. Cl.
*H04W 76/30* (2018.01)
*H04W 92/10* (2009.01)

(58) Field of Classification Search
CPC ............. H04W 12/04; H04W 12/0433; H04W 12/08; H04W 12/10; H04W 12/37; H04W 28/0257; H04W 36/0038; H04W 80/10; H04L 63/123; H04L 63/20; H04L 63/205; H04L 69/18; H04L 69/327; G06F 21/6209; G06F 21/64
See application file for complete search history.

(56) References Cited

U.S. PATENT DOCUMENTS

| | | | | |
|---|---|---|---|---|
| 2020/0322804 | A1* | 10/2020 | Vutukuri | H04W 12/106 |
| 2021/0084130 | A1* | 3/2021 | Dai | H04L 69/327 |
| 2021/0127254 | A1* | 4/2021 | Ben Henda | H04W 76/25 |
| 2022/0038878 | A1* | 2/2022 | Jung | H04W 4/14 |

FOREIGN PATENT DOCUMENTS

| | | | | |
|---|---|---|---|---|
| CN | 111149379 A | * | 5/2020 | H04L 63/205 |
| KR | 1020170038096 A | | 4/2017 | |
| KR | 1020180030023 A | | 3/2018 | |
| WO | WO-2019193147 A1 | * | 10/2019 | H04L 63/123 |

OTHER PUBLICATIONS

Office Action, Including English Summary, for Argentinian Patent Application N° P190100916, mailed Nov. 4, 2022, 7 pages.
International Search Report and Written Opinion mailed May 31, 2019 for International Application No. PCT/SE2019/058622, 11 pages.
ZTE, 51416603A1, Guarantee the UE Max Data Rate for Integrity Protection, 3GPP TSG-RAN WG3 #99bis, R3-181691, Sanya, China, Apr. 16-20, 2018, 7 Pages.
ZTE Corporation, 51342362A1, Consideration of UP Integrity Configuration, 3GPP TSG-RAN WG2 Meeting #99bis, R2-1713014, Prague, Czech Republic, Oct. 9-13, 2017, 3 pages.
ZTE Corporation, Sanechips, 51399817A1, Framework for DRB Integrity Protection, 3GPP TSG-RAN WG2 Meeting #101, Athens, Greece, Feb. 26-Mar. 2, 2018, 3 pages.
3GPP TR 33.899 V1.3.0, "3rd Generation Partnership Project; Technical Specification Group Services and System Aspects; Study on the security aspects of the next generation system (Release 14)", 3GPP TR 33.899 V1.3.0, Aug. 2017.
3GPP TS 33.501 V15.0.0, "3rd Generation Partnership Project; Technical Specification Group Services and System Aspects; Security architecture and procedures for 5G system (Release 15)", 3GPP TS 33.501 V15.0.0, Mar. 2018.
ZTE Corporation, Sanechips. "Framework for DRB integrity protection." 3GPP TSG RAN WG2 #101 R2-1802049, Mar. 2, 2018.
Japanese Notice of Reasons for Rejection, Japanese Application No. 2020-553544, mailed Oct. 26, 2021, 7 pages.
Korean Notice of Allowance, Korean Patent Application No. 2020-7029034, mailed Nov. 25, 2021, 5 pages.

* cited by examiner

US 12,200,491 B2

NON-ORTHOGONAL SIGNALING FOR RADIO ACCESS NETWORKS

This application is a 35 U.S.C. § 371 national stage application of PCT International Application No. PCT/SE2019/058622 filed on May 4, 2019, which itself claims priority to U.S. Provisional Application No. 62/653,794 filed Apr. 6, 2018, the disclosure and content of both of which is incorporated by reference herein in their entireties.

TECHNICAL FIELD

The present disclosure relates generally to communications, and more particularly, to wireless communications and related wireless devices and network nodes.

BACKGROUND

The $3^{rd}$ Generation Partnership Project (3GPP) is developing standards for $5^{th}$ generation wireless systems (5G) and/or Next Generation (NG) Systems. 5G supports many scenarios and use cases and will be an enabler for the internet of things (IoT). NG systems provide connectivity to a wide range of devices such as sensors, smart wearables, vehicles, and machines. Flexibility can be a valuable characteristic in NG Systems. This can be reflected in the security requirements for network access that are mandating the support of alternative authentication methods and different types of credentials than the usual authentication and key agreement (AKA) credentials pre-provisioned by the operator and securely stored in the universal integrated circuit card (UICC). This can allow factory owners or enterprises to leverage their own identity and credential management systems for authentication and access network security.

The 3GPP architecture working group (SA2) has finalized the architecture of 5G Systems. FIG. 1 depicts an example of a non-Roaming 5G System Architecture in reference point representation from TS 23.501 [1]. The 3GPP security group (SA3) may finalize the security specification for the 5G Systems in TS 33.501 [2]. Among the new security features in 5G Systems are the introduction of the integrity protection of the User Plane (UP) and the support for a separate mechanism for the negotiation of the UP security. The separate mechanism for the negotiation of the UP security can include a procedure for determining whether and which of integrity or confidentiality should be activated for a UP session.

In long term evolution (LTE), there is no integrity protection for UP and the negotiation of UP confidentiality is integrated in the activation of the security for the Control Plane (CP) in the Access Stratum (AS) between the evolved node B (eNB) and the user equipment (UE). As described in TS 33.401 [3], the security for the AS CP can be activated by a run of the AS Security Mode Command (SMC) procedure, which can allow selection of cryptographic algorithms and activation of security for the radio resource control (RRC) protocol. A lower level protocol can provide security, for example a packet data convergence protocol in the AS CP protocol stack. Furthermore, since integrity protection of UP is supported in LTE and confidentiality protection is mandatory, the confidentiality algorithm selected during the AS SMC can be automatically used for the protection of the UP traffic.

The negotiation of UP security in the 5G System can allow the radio access network (RAN) node to receive a UP security policy from the Core Network (CN) during the Packet Data Unit (PDU) Session establishment procedure. This policy can be applied on a PDU Session level. For example, RAN can be applied to the UP security, received from the CN, to all the Data Radio Bearers (DRBs) serving the PDU Session. Furthermore, this UP Security policy can include indications on whether to activate integrity protection, confidentiality protection, or both.

This kind of flexibility can be important in a 5G System, which can be expected to provide connectivity for various types of services and devices. For example, integrity protection may be sufficient for IoT services while for the usual voice and broadband services, as in LTE, confidentiality protection may be required.

FIG. 2 depicts an example of a simplified flow of the PDU Session establishment procedure from TS 23.502 [1]. The term Radio Access Network can be used to denote an Access Network (AN) of 3GPP type. Since the 5G System was expected to support both 3GPP and non-3GPP AN type, the system attempts to be agnostic towards the type of AN. Therefore, (R)AN can be used to refer to both types of ANs in all procedures that are in fact agnostic.

In operation 210, the UE can initiate the procedure by sending a PDU Session Establishment Request Network Access Stratum (NAS) message to the access and mobility management function (AMF). In operation 220, the AMF can trigger different CN interactions, for example, for the selection of the SMF, the retrieval of the subscription data, or the allocation of UP resources. In operation 230, the SMF can acquire the UP Security Policy for this session. The UP Security Policy can be based on subscription data, local configuration, or provisioning from another CN Network Function (NF) such as unified data management (UDM) or policy control function (PCF). In operation 240, the SMF can use the Namf_Communication_N1N2MessageTransfer service to transfer a message containing an N2 part destined to the (R)AN and an N1 part destined to the UE. The N2 part can include among the UP Security policy for the current session being established. In operation 250, the AMF can forward the SMF message to the (R)AN. In operation 260, the (R)AN can act on the N2 part and can forward the N1 part to the UE. The (R)AN can retrieve the UP Security Policy and use it during the AN-specific resource setup to indicate to the UE, via RRC signaling, whether to activate integrity protection, confidentiality protection, or both for each of the DRBs serving the session being established.

A CN can establish multiple integrity protected PDU sessions creating a risk that the UE rejects a PDU session and is delayed access to service.

SUMMARY

According to some embodiments of inventive concepts, a mechanism can be provided to prevent rejection of PDU Sessions and unwanted service delays by handling a Max DRB-IP Rate for a user equipment (UE) in a centralized manner to ensure that the UE has capacity prior to AS resource allocation.

According to some embodiments, a method may be provided to operate a UE for handling security policy for user plane protection of communications in a communications system. The method includes transmitting a packet data unit (PDU) session establishment request network access stratum (NAS) message toward an Access and Mobility Management Function (AMF) to establish a PDU session. The method further includes receiving an access network (AN) specific resource setup message indicating whether the UE is to activate integrity protection for data radio bearers (DRBs) serving the PDU session. The method may further include summing DRB Integrity Protected (DRB-IP) rates that are allocated for the DRBs of the PDU session that are indicated by the AN specific resource setup message for the UE to activate integrity protection, to generate a session consumed DRB-IP rate. The method may further include adjusting an available DRB-IP rate of the UE based on the session consumed DRB-IP rate.

A potential advantage of this method is that radio resources of the communication system are more efficiently used. UEs have varying operationally limits on their computational capacity to process DRBs that are to be integrity protected during PDU sessions, which can be referred to as a maximum DRB-IP rate of a UE. A UE that is operated according to this method may dynamically track how much of its maximum DRB-IP rate is presently being used to provide integrity protection for DRBs of any active PDU sessions. The UE can thereby coordinate with the AMF and/or SMF to avoid erroneous selection of security policies for use in communications between the AN and UE and resulting incompatible assignment of DRB rates for integrity protection that would exceed the available capacity of the UE and result in wasteful allocation of system radio resources.

According to some other embodiments, a method is provided to operate an Access and Mobility Management Function (AMF) of a communications system. The method includes receiving a packet data unit (PDU) session establishment request network access stratum (NAS) message from a user equipment (UE) requesting establishment of a PDU session. The PDU session establishment request NAS message includes an indication of an available data radio bearer integrity protected (DRB-IP) rate for which the UE presently has available computational capacity for processing DRBs that are integrity protected for the PDU session being established. The method further includes communicating toward a Session Management Function (SMF) a PDU session create message containing the indication of the available DRB-IP rate of the UE. The method further includes receiving a SMF message containing an indication of a user plane (UP) security policy for a PDU session being established. The method further includes communicating a message containing the indication of the UP security policy to an access node (AN) that is communicating through a wireless air interface with the UE.

According to some other embodiments, a method is provided to operate a Session Management Function (SMF) of a communications system. The method includes receiving from an Access and Mobility Management Function (AMF) a packet data unit (PDU) session create message for a user equipment (UE) that is requesting establishment of a PDU session. The PDU session create message includes an indication of an available data radio bearer integrity protected (DRB-IP) rate for which the UE presently has available capacity for processing DRBs that are integrity protected for the PDU session being established. The method further includes determining a user plane (UP) security policy for the PDU session based on the indication of the available DRB-IP rate for which the UE presently has available capacity. The method further includes communicating to the AMF a message containing an indication of the UP security policy for the PDU session being established.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

Figure 4:
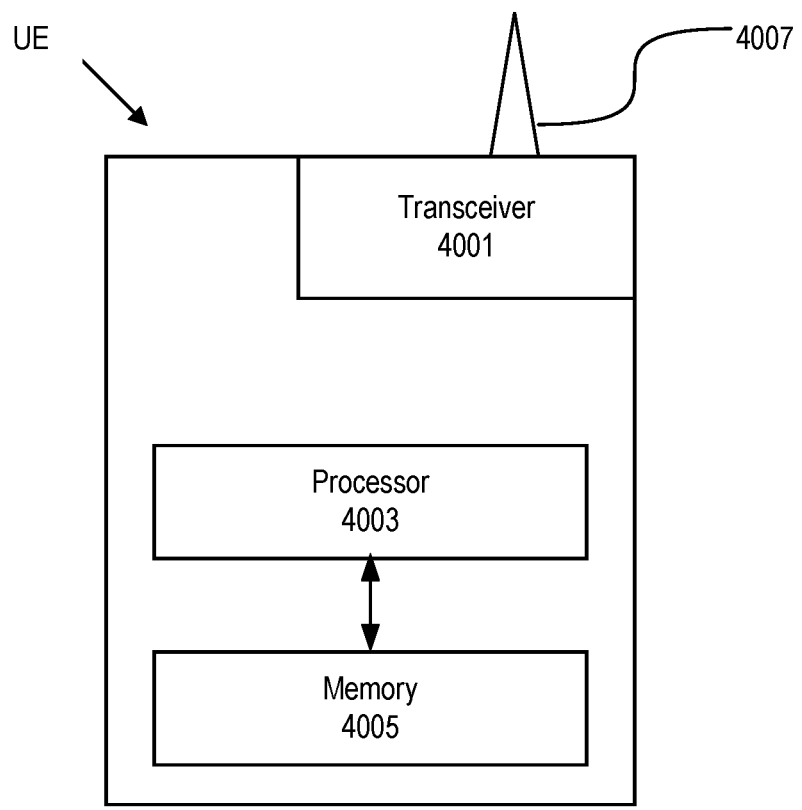
FIG. 4 is a block diagram illustrating an example of a wireless device UE according to some embodiments of the present disclosure.

FIG. 4 is a block diagram illustrating elements of a UE, which can be interchangeably called any one or more of a wireless terminal, a wireless communication device, wireless device, a wireless communication terminal, and a user equipment node/terminal/device without limitation on the operations thereof. The UE is configured to provide wireless communication according to embodiments of inventive concepts. As shown, UE may include at least one antenna 4007, and at least one transceiver circuit 4001 (also referred to as a transceiver) including a transmitter and a receiver configured to provide uplink and downlink radio communications with a base station eNB of a wireless communication network (also referred to as a radio access network RAN). UE may also include at least one processor circuit 4003 (also referred to as a processor) coupled to the transceiver, and at least one memory circuit 4005 (also referred to as memory) coupled to the processor. The memory 4005 may include computer readable program code that when executed by the processor 4003 causes the processor to perform operations according to embodiments disclosed herein. According to other embodiments, processor 4003 may be defined to include memory so that a separate memory circuit is not required. UE may also include an interface (such as a user interface) coupled with processor 4003, and/or wireless device UE may be an IoT and/or MTC device.

As discussed herein, operations of wireless device UE may be performed by processor 4003 and/or transceiver 4001. For example, processor 4003 may control transceiver 4001 to transmit uplink communications through transceiver 4001 over a radio interface to a base station eNB of a wireless communication network and/or to receive downlink communications through transceiver 4001 from a base station eNB of the wireless communication network over a radio interface. Moreover, modules may be stored in memory 4005, and these modules may provide instructions so that when instructions of a module are executed by processor 4003, processor 4003 performs respective operations (e.g., operations discussed below with respect to Example Embodiments).

Figure 5:
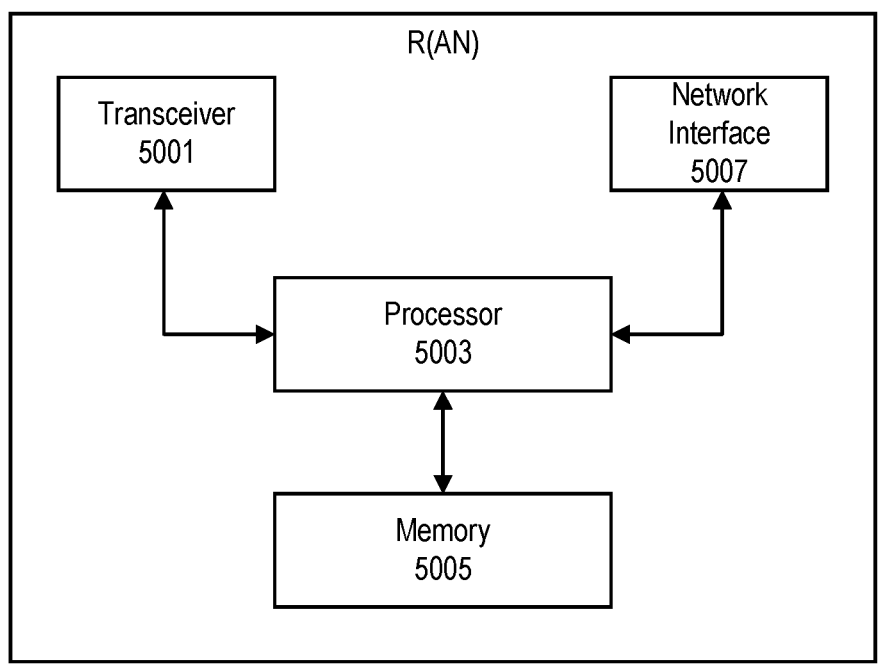
FIG. 5 is a block diagram illustrating an example of a (R)AN according to some embodiments of the present disclosure.

FIG. 5 is a block diagram illustrating elements of a (R)AN configured to provide cellular communication according to embodiments of inventive concepts. As shown, the (R)AN may include at least one transceiver circuit 5001 (also referred to as a transceiver) including a transmitter and a receiver configured to provide uplink and downlink radio communications with wireless devices. The (R)AN may include at least one network interface circuit 5007 (also referred to as a network interface) configured to provide communications with nodes (e.g., with base stations and/or core network nodes). The (R)AN may also include at least one processor circuit 5003 (also referred to as a processor) coupled to the transceiver, and at least one memory circuit 5005 (also referred to as memory) coupled to the processor. The memory 5005 may include computer readable program code that when executed by the processor circuit 5003 causes the processor to perform operations according to embodiments disclosed herein. According to other embodiments, processor 5003 may be defined to include memory so that a separate memory circuit is not required.

As discussed herein, operations of the (R)AN may be performed by processor 5003, network interface 5007, and/or transceiver 5001. For example, processor 5003 may control transceiver 5001 to transmit downlink communications through transceiver 5001 over a radio interface to one or more UEs and/or to receive uplink communications through transceiver 5001 from one or more UEs over a radio interface. Similarly, processor 5003 may control network interface 5007 to transmit communications through network interface 5007 to one or more other network nodes and/or to receive communications through network interface from one or more other network nodes. Moreover, modules may be stored in memory 5005, and these modules may provide instructions so that when instructions of a module are executed by processor 5003, processor 5003 performs respective operations (e.g., operations discussed below with respect to Example Embodiments).

Figure 6:
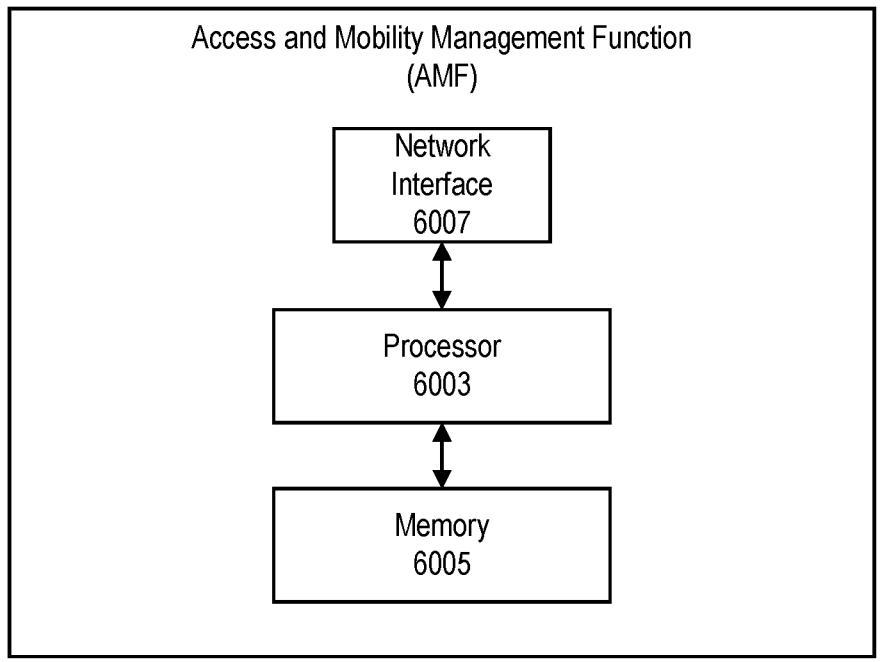
FIG. 6 is a block diagram illustrating an example of a AMF according to some embodiments of the present disclosure.

FIG. 6 is a block diagram illustrating elements of an AMF configured to provide wireless communication according to embodiments of inventive concepts. As shown the AMF may include at least one network interface circuit 6007 (also referred to as a network interface) configured to provide communications with nodes (e.g., with base stations and/or core network nodes). The AMF may also include at least one processor circuit 6003 (also referred to as a processor) coupled to the transceiver, and at least one memory circuit 6005 (also referred to as memory) coupled to the processor. The memory circuit 6005 may include computer readable program code that when executed by the processor 6003 causes the processor 6003 to perform operations according to embodiments disclosed herein. According to other embodiments, processor 6003 may be defined to include memory so that a separate memory circuit is not required.

As discussed herein, operations of the AMF may be performed by processor 6003 and/or network interface 6007. Modules may be stored in memory 6005, and these modules may provide instructions so that when instructions of a module are executed by processor 6003, processor 6003 performs respective operations (e.g., operations discussed below with respect to Example Embodiments).

Figure 7:
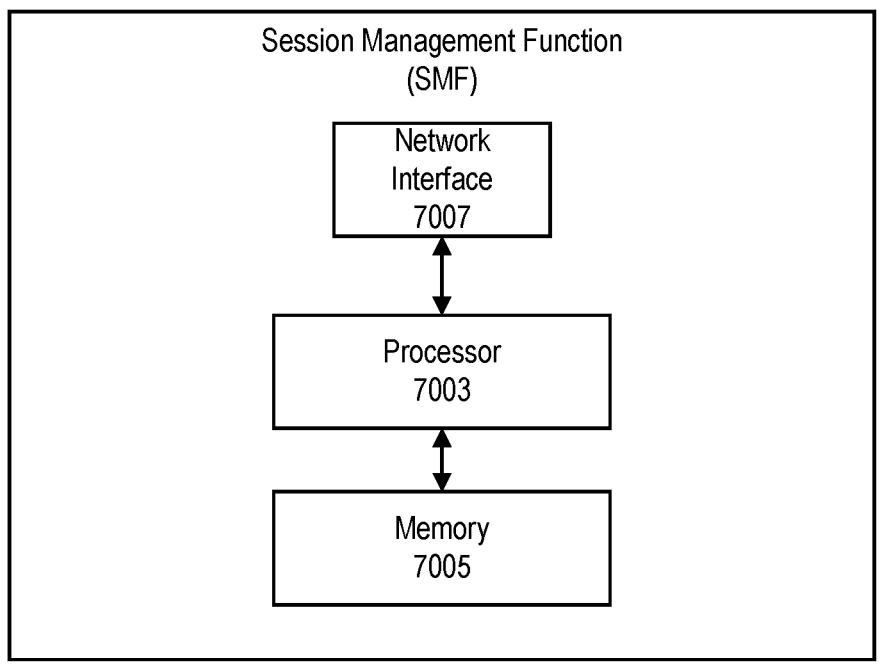
FIG. 7 is a block diagram illustrating an example of a SMF according to some embodiments of the present disclosure.

FIG. 7 is a block diagram illustrating elements of an SMF configured to provide wireless communication according to embodiments of inventive concepts. As shown the SMF may include at least one network interface circuit 7007 (also referred to as a network interface) configured to provide communications with nodes (e.g., with base stations and/or core network nodes). The SMF may also include at least one processor circuit 7003 (also referred to as a processor) coupled to the network interface, and at least one memory circuit 7005 (also referred to as memory) coupled to the processor. The memory 7005 may include computer readable program code that when executed by the processor 7003 causes the processor to perform operations according to embodiments disclosed herein. According to other embodiments, processor 7003 may be defined to include memory so that a separate memory circuit is not required.

As discussed herein, operations of the SMF may be performed by processor 7003 and/or network interface 7007.

Modules may be stored in memory 7005, and these modules may provide instructions so that when instructions of a module are executed by processor 7003, processor 7003 performs respective operations (e.g., operations discussed below with respect to Example Embodiments).

In some embodiments, the AMF and SMF may share one or more components. For example, operations of the AMF and SMF may be performed by one or more shared processors. The processors may be included in one or more nodes across one or more RAN.

In some embodiments, a parameter referred to as Max DRB-IP Rate can be introduced in the UE in response to hardware restrictions and performance overhead. This parameter can be included in the UE capabilities Information Element (IE) and can be used to indicate the UE capacity for integrity protected DRBs. As part of the UE capabilities, the parameter can be signaled to the CN during the initial Registration procedure as described in TS 23.502 [1].

For a given a UE, in case the CN establishes multiple integrity protected PDU Sessions without considering the MAX DRB-IP rate, then there is a risk that the UE rejects a PDU Sessions and is thus delayed access to service. Furthermore, this new parameter defines the upper bound for the sum of all rates in all integrity protected active DRBs. This, in addition to the fact that the 5G systems allows UE to establish multiple PDU Sessions in parallel and even involving different SMFs, introduces more complexity. In some examples, the Max DRB-IP Rate is managed somewhere that can track, for a given UE, all the active PDU Sessions. The 3GPP 5G standards may not provide a mechanism for how to handle the Max DRB-IP Rate when determining the UP Security Policy.

In some embodiments of the present disclosure, a mechanism can be provided to handle the Max DRB-IP Rate in a centralized manner to ensure that the UE has capacity prior to AS resource allocation and thus prevent rejection of PDU Sessions and unwanted service delays. In some examples, the UE provides the centralized handling itself. In some examples, handling the Max DRB-IP in a centralized manner can allow full use of the Max DRB-IP Rate and can provide as much security as possible for the given upper bound. In some examples, handling the Max DRB-IP in a centralized manner can prevent unexpected rejection of PDU Sessions to Max DRB-IP rate exhaustion, which can reduce delays to services. In some examples, handling the Max DRB-IP in a centralized manner can support parallel PDU Sessions even involving different SMFs. In some examples, handling the Max DRB-IP in a centralized manner can allow control of which PDU Sessions to prioritize being integrity protected.

Figure 3:
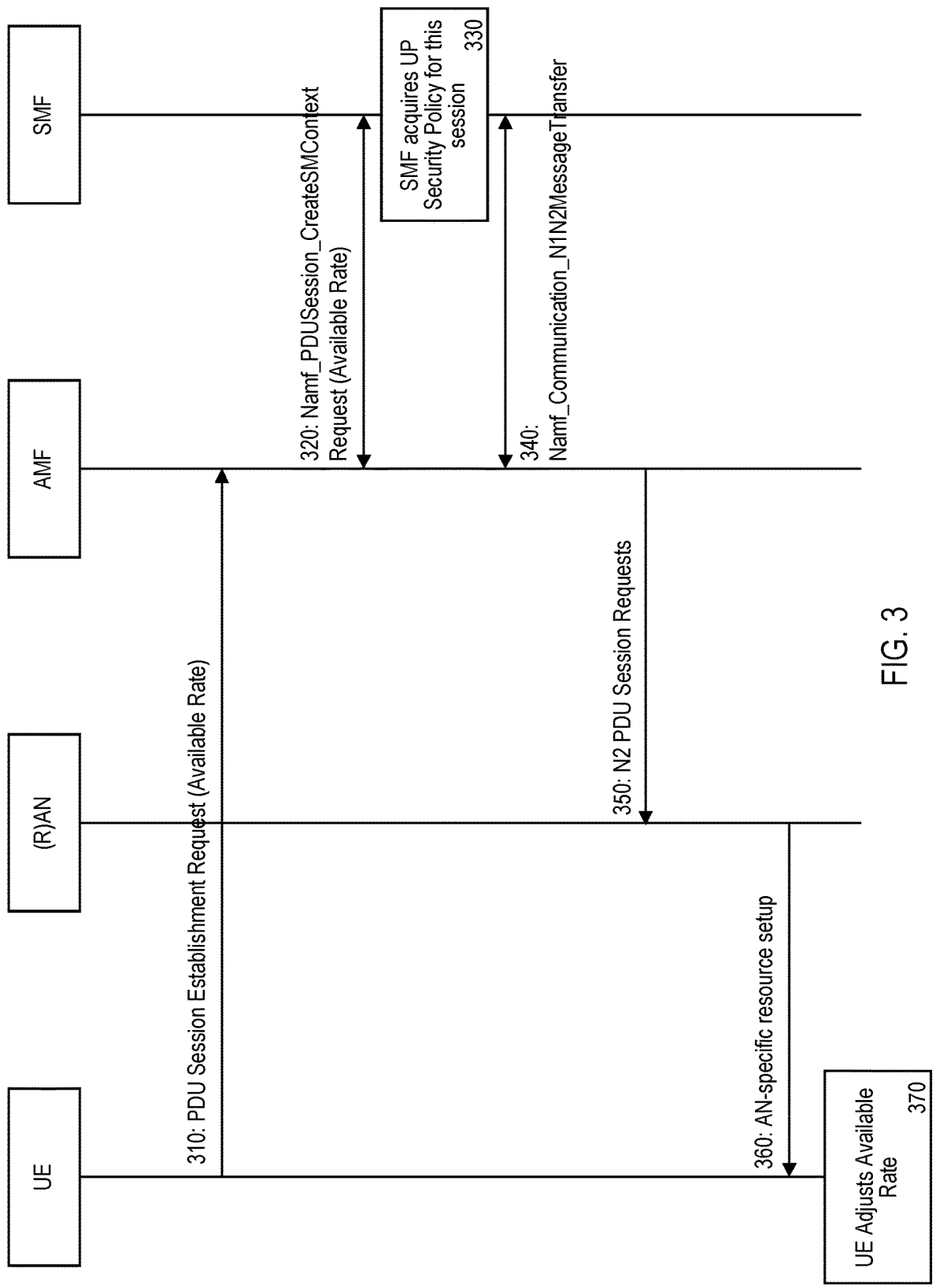
FIG. 3 is a flow diagram illustrating an example of management of the max DRB-IP rate during a PDU session establishment procedure according to some embodiments of the present disclosure.

In some embodiments, responsibility for handling of the Max DRB-IP Rate and the book keeping of used resources can be performed by the UE. For example, the UE can indicate the available rate to the core network (CN) during PDU Session Establishment procedure and the CN can determine the UP Security policy based on the provided information. In some examples, assigning the UE to handle UE-specific resources can be advantageous because the UE can track use and availability of the UE-specific resources. In contrast, delegating the handling of the Max DRB-IP Rate to the CN may require additional CN signaling and may not eliminate the risk for a mismatch between the computed available rate in the CN and the amount of available resource in the UE. FIG. 3 depicts an example of UE controlled management of the Max DRB-IP during a PDU session establishment procedure.

In operation 310, the UE can initiate a PDU Session Establishment procedure by sending a PDU Session Establishment Request NAS message to the AMF. The UE can include an indication on the available rate. In some examples, the UE may not have any active PDU Sessions with integrity protection, and the available rate parameter can indicate the full Max DRB-IP rate value.

In operation 320, the AMF using the indicated signaling, and which may use other not shown CN signaling, can send a Namf_PDUSession_CreateSMContext Request message to the selected SMF. This message can include the available rate forwarded by the UE.

In operation 330, the SMF can determine the UP Security Policy for the PDU Session based on the available rate provided by the UE through the AMF. For example, the SMF can decide whether to activate integrity protection based on the required Flows quality of service (QoS) and the available rate in order to make sure that the UE can support the required rates with integrity protection.

Figure 1:
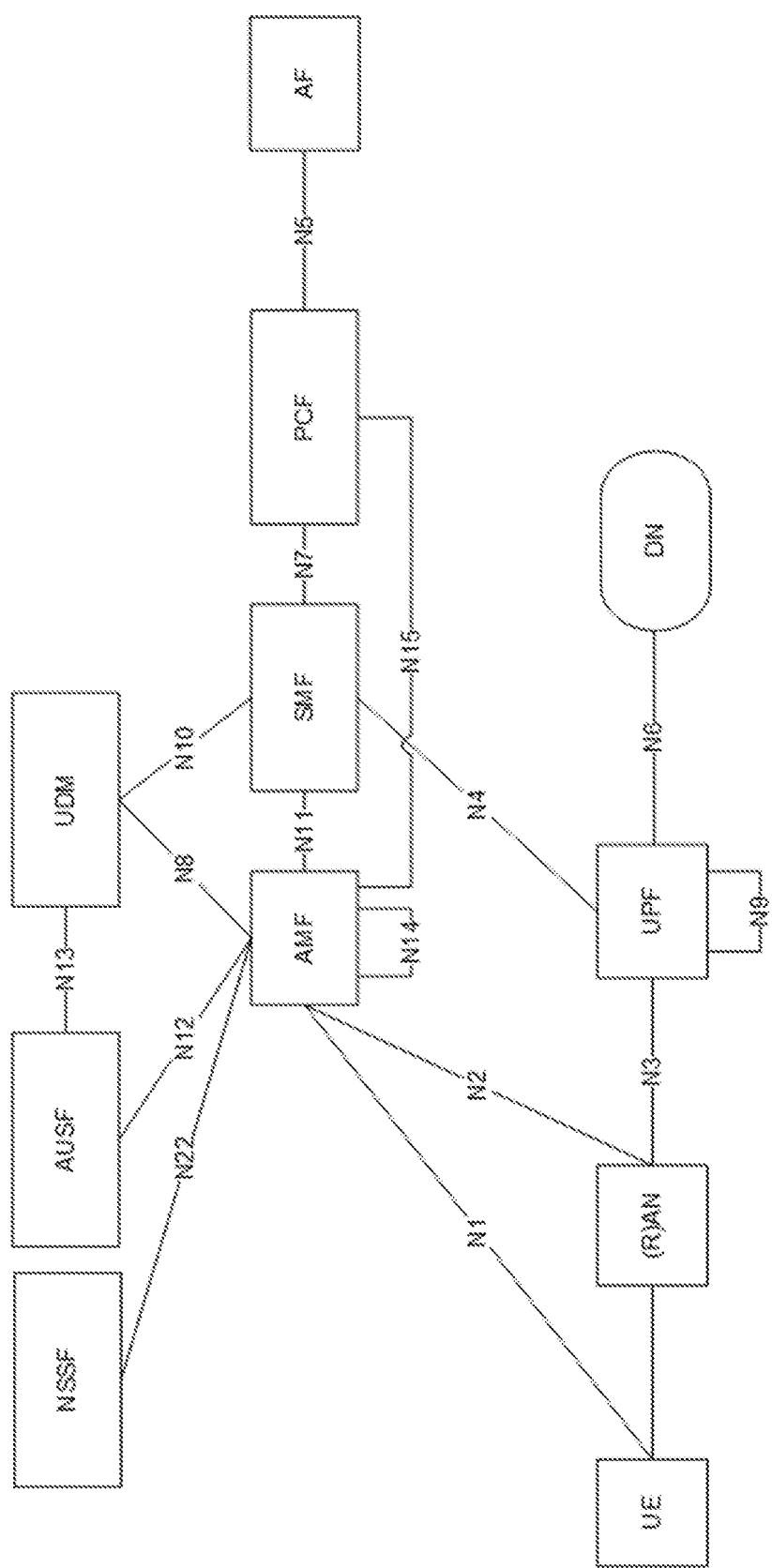
FIG. 1 is a block diagram illustrating an example of a non-roaming 5G system architecture in reference point representation.
Figure 2:
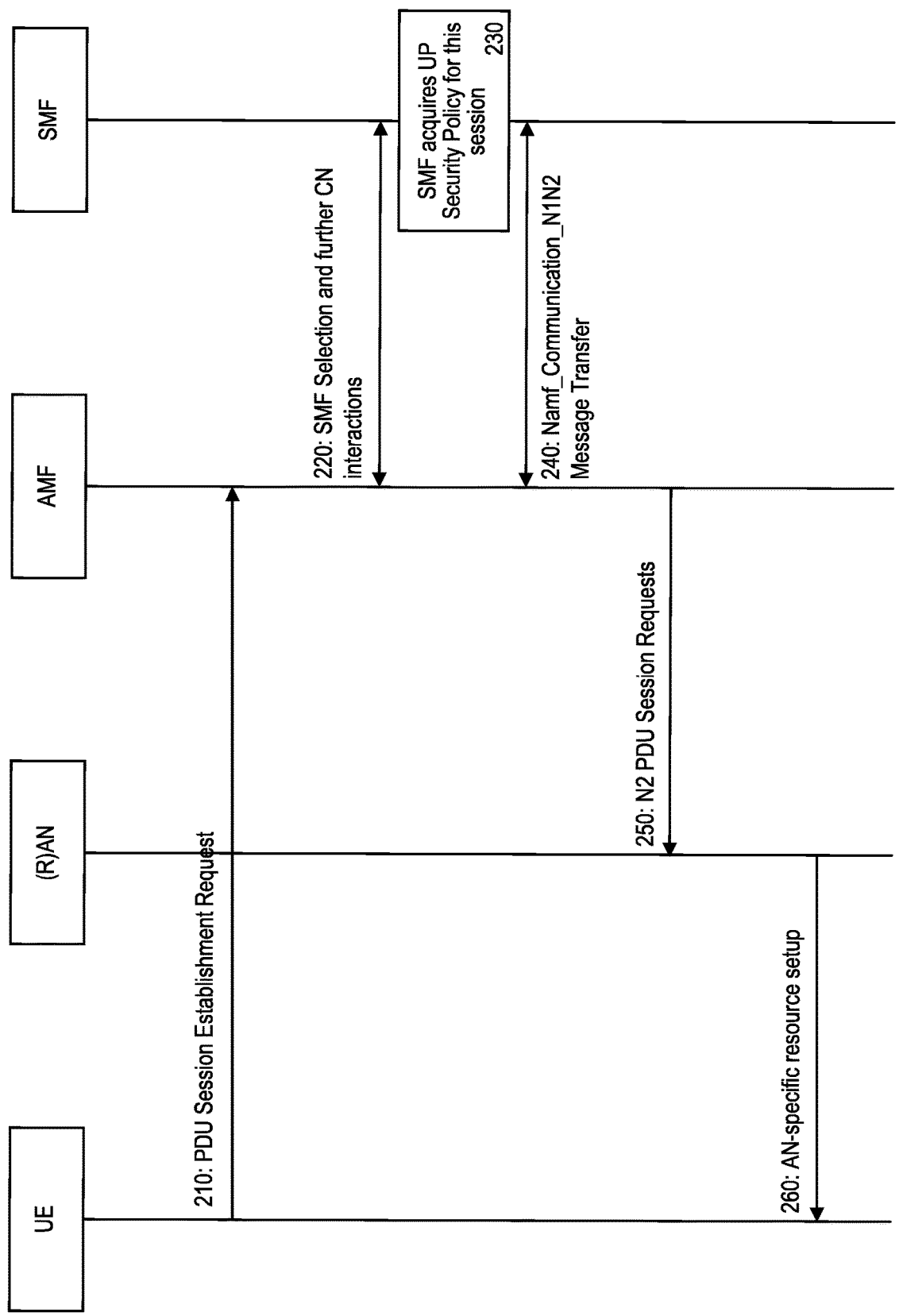
FIG. 2 is a flow diagram illustrating an example of a PDU session establishment procedure.

Operations 340, 350, and 360 are similar to operations 240, 250, and 260 discussed above in reference to FIG. 2.

In operation 370, following the setup of the DRBs for the PDU Session and based on whether integrity protection is activated for some of the new DRBs or not, the UE can adjust the internal available rate variable to keep track of the resource usage by subtracting the allocated rates for integrity protected DRBs from the currently stored value.

Various implementations are possible for how the UE keeps track of the integrity protection resource usage. In some examples, the UE may not store the integrity protection resource usage in a variable. For example, the UE can determine the integrity protection resource usage on a-need-to-know-basis by summing the rates of all active DRBs with integrity protection on.

In some embodiments, UE controlled management of the Max DRB-IP may not require additional signaling and book keeping overhead in the CN NFs besides that of forwarding the UE signaled indication on available rate. The risks of mismatch and wrong estimation can be reduced or minimized.

Operations of a wireless device UE will now be discussed with reference to the flow charts of FIGS. 8A-B according to some embodiments of inventive concepts. For example, modules may be stored in wireless terminal memory 4005 of FIG. 4 and these modules may provide instructions so that when the instructions of a module are executed by wireless device processor 4003, processor 4003 performs respective operations of the flow chart of FIG. 8

Figure 8A:
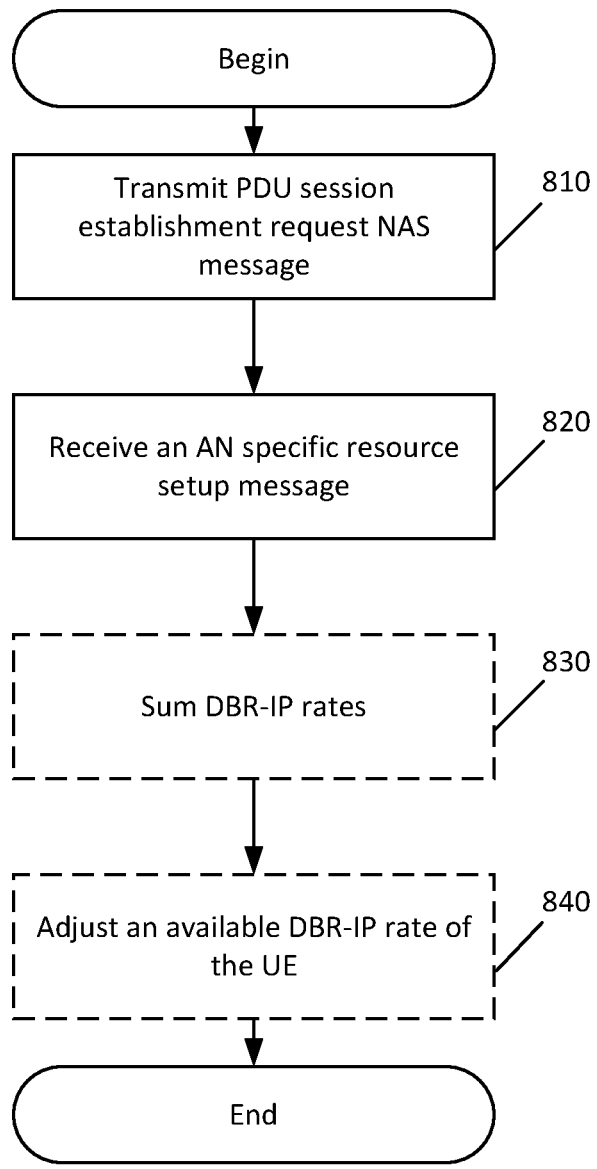
FIGS. 8A-B are flow charts illustrating example operations of a wireless device according to some embodiments of the present disclosure.

FIG. 8A depicts an example of UE operations for handling security policy for UP protection of communications in a communications system according to some embodiments. At block 810, the processor 4003 can transmit through the transceiver 4001 a PDU session establishment request NAS message. The PDU session establishment request NAS message can be transmitted toward an AMF to establish a PDU session. At block 820, the processor 4003 can receive through the transceiver 4001 an AN specific resource setup message. The AN specific resource setup message can indicate whether the UE is to activate integrity protection for DRBs serving the PDU session. At block 830, the processor 4003 can sum DRB-IP rates that are allocated for the DRBs of the PDU session that are indicated by the AN specific resource setup message for the UE to activate integrity protection, to generate a session consumed DRB-IP rate. At block 840, the processor 4003 can adjust an available DRB-IP rate of the UE based on the session consumed DRB-IP rate.

In additional or alternative embodiments, the processor 4003 can generate the session consumed DRB-IP rate without including in the summing any DRB-IP rates that are allocated for DRBs of the PDU session that are not indicated by the AN specific resource setup message for the UE to activate integrity protection.

In additional or alternative embodiments, when the PDU session will be the only active PDU session between the UE and the AN, the adjustment of the available DRB-IP rate of the UE can include determining the available DRB-IP rate of the UE based on a difference between a maximum DRB-IP rate of the UE and the session consumed DRB-IP rate. The maximum DRB-IP rate of the UE can correspond to a maximum computational capacity of the UE to process DRBs that are integrity protected during PDU sessions.

In additional or alternative embodiments, when the PDU session is one of a plurality of active PDU sessions between the UE and the AN, the adjustment of the available DRB-IP rate of the UE can include determining the available DRB-IP rate of the UE based on a difference between a maximum DRB-IP rate of the UE and a summation of the session consumed DRB-IP rates that have been generated for each of the active PDU sessions. The maximum DRB-IP rate of the UE corresponds to a maximum computational capacity of the UE to process DRBs that are integrity protected during PDU sessions.

Figure 8B:
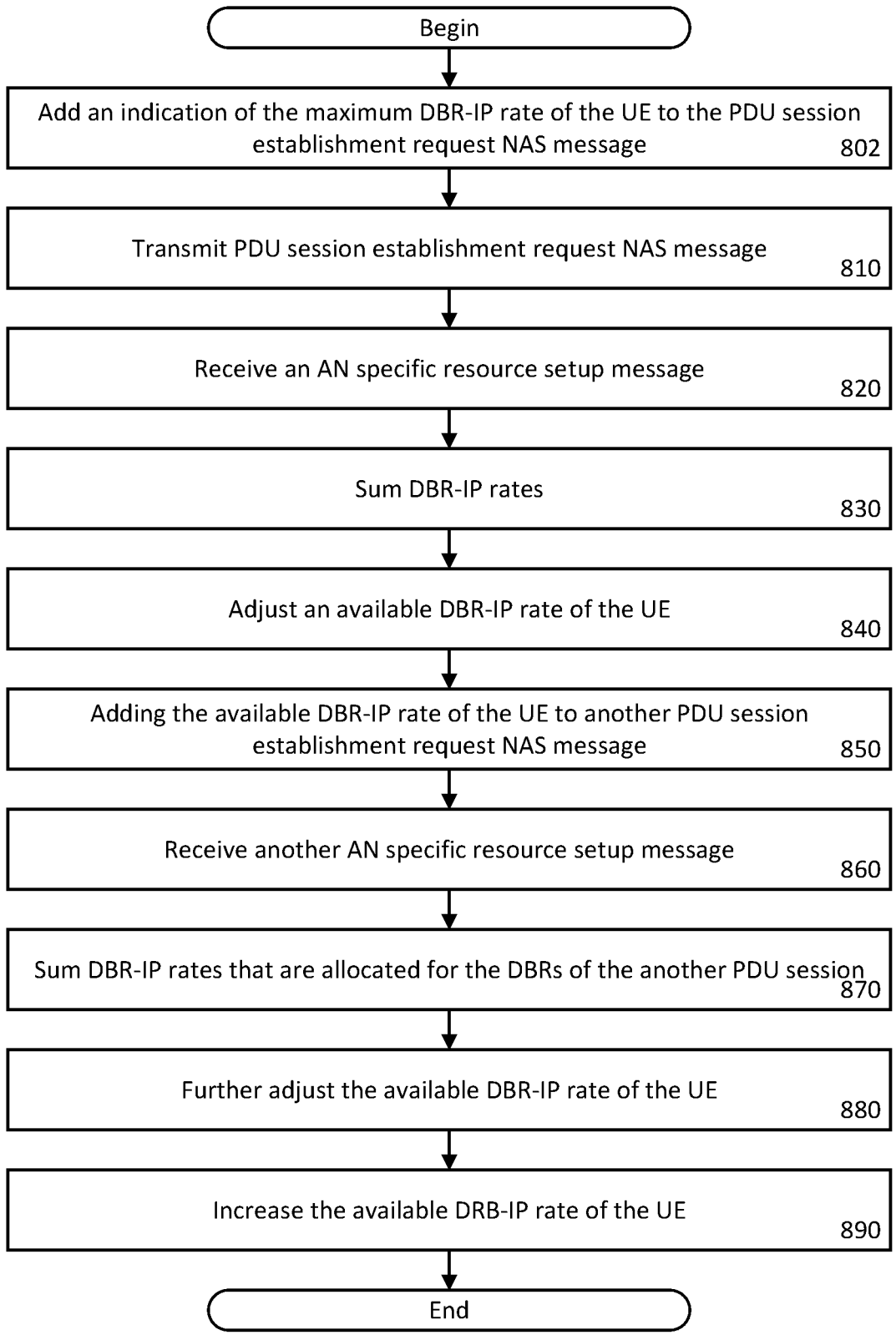

FIG. 8B depicts another example of UE operations for handling security policy for UP protection of communications in a communications system according to some embodiments. FIG. 8B includes block/operations similar to those discussed above with respect to FIG. 8A, but FIG. 8B further includes blocks 802, 850, 860, 870, 880, and 890. At block 802, before transmitting the PDU session establishment request NAS message toward the AMF and when the UE does not have an active PDU session with the AN which has DRBs for which the UE provides integrity protection, the processor 4003 can add an indication of the maximum DRB-IP rate of the UE to the PDU session establishment request NAS message that is transmitted toward the AMF to establish a PDU session. At block 850, the processor 4003 can add the available DRB-IP rate of the UE to another PDU session establishment request NAS message that is transmitted toward the AMF to establish another PDU session. At block 860, the processor 4003 can receive through the transceiver 4001 another AN specific resource setup message indicating whether the UE is to activate integrity protection for DRBs serving the another PDU session. At block 870, the processor 4003 can sum DRB-IP rates that are allocated for the DRBs of the another PDU session that are indicated by the another AN specific resource setup message for the UE to activate integrity protection, to generate another session consumed DRB-IP rate. At block 880, the processor 4003 can further adjust the available DRB-IP rate of the UE based on a difference between the available DRB-IP rate of the UE and the another session consumed DRB-IP rate. At block 890, the processor 4003 can responsive to releasing the PDU session, the processor 4003 can increase the available DRB-IP rate of the UE based on the session consumed DRB-IP rate of the PDU session.

Various operations from the flow chart of FIGS. 8A-B may be optional with respect to some embodiments of wireless devices and related methods. Regarding methods of example embodiment 8 (set forth below), for example, operations of blocks 802, 850, 560, 870, 880, and 890 of FIGS. 8A-B may be optional.

Operations of an AMF will now be discussed with reference to the flow chart of FIG. 9. For example, modules may be stored in AMF memory 6005 of FIG. 6 and these modules may provide instructions so that when the instructions of a module are executed by processor 6003, processor 6003 performs respective operations of the flow chart of FIG. 9.

Figure 9:
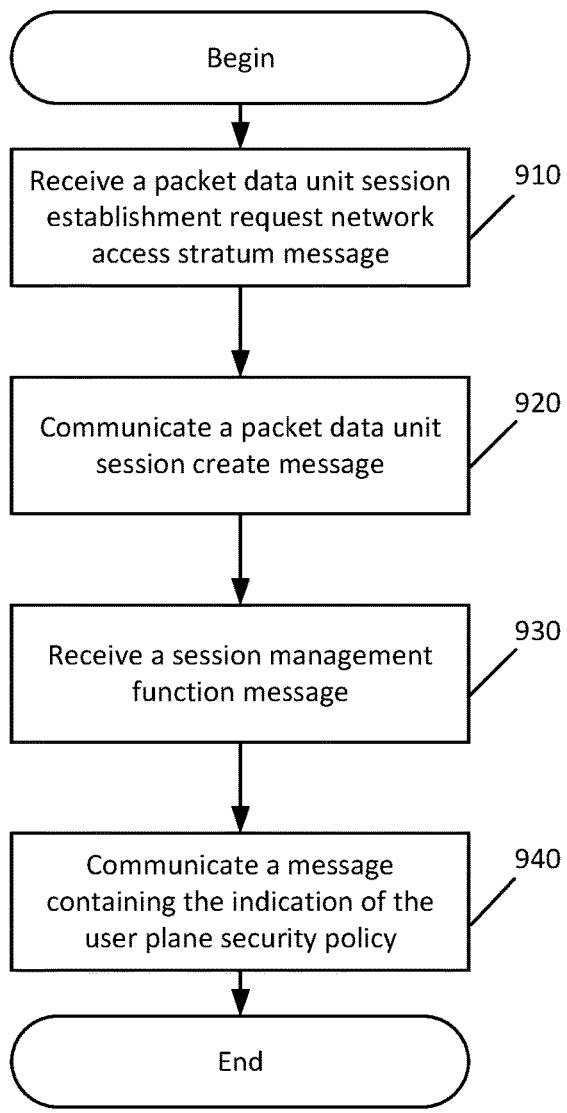
FIG. 9 is a flow chart illustrating example operations of an AMF according to some embodiments of the present disclosure.

FIG. 9 depicts an example of AMF operations according to some embodiments. At block 910, processor 6003 can receive through network interface 6007 a PDU session establishment request NAS message from a UE requesting establishment of a PDU session. The PDU session establishment request NAS message can include an indication of an available DRB-IP rate for which the UE presently has available computational capacity for processing DRBs that are integrity protected for the PDU session being established. At block 920, the processor 6003 can communicate through network interface 6007 toward a Session SMF a PDU session create message containing the indication of the available DRB-IP rate of the UE. At block 930, the processor 6003 can receive through network interface 6007 a SMF message containing an indication of a UP security policy for a PDU session being established. At block 940, the processor 6003 can communicate through network interface 6007 a message containing the indication of the UP security policy to an AN that is communicating through a wireless air interface with the UE.

Various operations from the flow chart of FIG. 9 may be optional with respect to some embodiments of base stations and related methods.

Operations of a SMF will now be discussed with reference to the flow chart of FIG. 10. For example, modules may be stored in SMF memory 7005 of FIG. 7 and these modules may provide instructions so that when the instructions of a module are executed by processor 7003, processor 7003 performs respective operations of the flow chart of FIG. 10.

Figure 10:
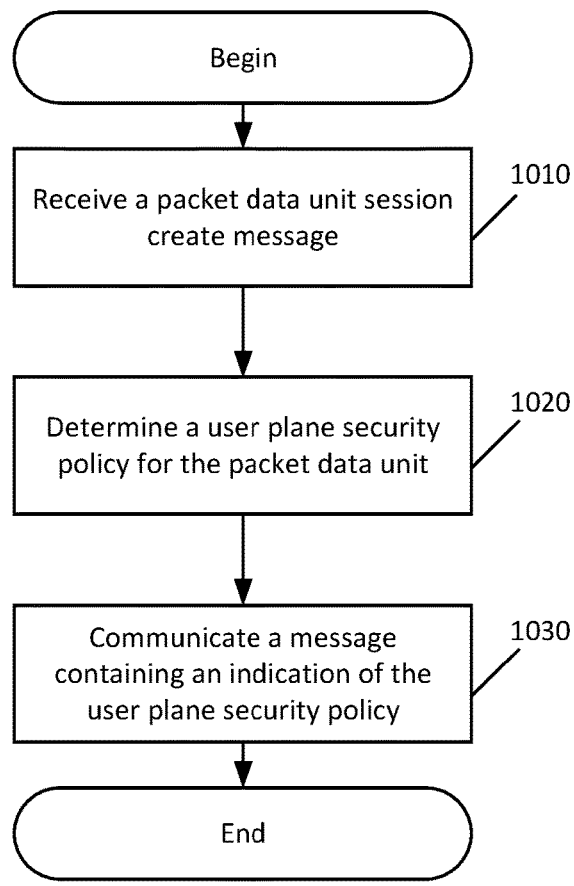
FIG. 10 is a flow chart illustrating example operations of a SMF according to some embodiments of the present disclosure.

FIG. 10 depicts an example of SMF operations according to some embodiments. At block 1010, processor 7003 can receive through network interface 7007 from an AMF a PDU session create message for a UE that is requesting establishment of a PDU session. The PDU session create message can include an indication of an available DRB-IP rate for which the UE presently has available capacity for processing DRBs that are integrity protected for the PDU session being established. At block 1020, processor 7003 can determine a UP security policy for the PDU session based on the indication of the available DRB-IP rate for which the UE presently has available capacity. At block 1030, processor 7003 can communicate through network interface 7007 to the AMF a message containing an indication of the UP security policy for the PDU session being established.

Various operations from the flow chart of FIG. 10 may be optional with respect to some embodiments of base stations and related methods.

In some embodiments, a user equipment (UE) is provided for handling security policy for user plane protection of communications in a communications system. The UE can include a transceiver configured to transmit and receive through a wireless air interface with an access node (AN) of the communications system. The UE can further include at least one processor connected to the transceiver and configured to perform operations. The operations can include transmitting through the transceiver a packet data unit, PDU, session establishment request network access stratum, NAS, message toward an Access and Mobility Management Function (AMF) to establish a PDU session. The operations can further include receiving through the transceiver an AN specific resource setup message indicating whether the UE is to activate integrity protection for data radio bearers, DRBs, serving the PDU session. The operations can further include summing DRB Integrity Protected, DRB-IP, rates that are allocated for the DRBs of the PDU session that are indicated by the AN specific resource setup message for the UE to activate integrity protection, to generate a session consumed DRB-IP rate. The operations can further include adjusting an available DRB-IP rate of the UE based on the session consumed DRB-IP rate.

In additional or alternative embodiments, the operations can further include generation of the session consumed DRB-IP rate can include not including in the summing any DRB-IP rates that are allocated for DRBs of the PDU session that are not indicated by the AN specific resource setup message for the UE to activate integrity protection.

In additional or alternative embodiments, the operations can further include when the PDU session will be the only active PDU session between the UE and the AN, the adjustment of the available DRB-IP rate of the UE can include determining the available DRB-IP rate of the UE based on a difference between a maximum DRB-IP rate of the UE and the session consumed DRB-IP rate. The maximum DRB-IP rate of the UE can correspond to a maximum computational capacity of the UE to process DRBs that are integrity protected during PDU sessions.

In additional or alternative embodiments, the operations can further include before transmitting the PDU session establishment request NAS message toward the AMF and when the UE does not have an active PDU session with the AN which has DRBs for which the UE provides integrity protection, adding an indication of the maximum DRB-IP rate of the UE to the PDU session establishment request NAS message that is transmitted toward the AMF to establish a PDU session.

In additional or alternative embodiments, the operations can further include when the PDU session is one of a plurality of active PDU sessions between the UE and the AN, the adjustment of the available DRB-IP rate of the UE comprises determining the available DRB-IP rate of the UE based on a difference between a maximum DRB-IP rate of the UE and a summation of the session consumed DRB-IP rates that have been generated for each of the active PDU sessions. The maximum DRB-IP rate of the UE corresponds to a maximum computational capacity of the UE to process DRBs that are integrity protected during PDU sessions.

In additional or alternative embodiments, the operations can further include following the adjustment of the available DRB-IP rate of the UE, adding the available DRB-IP rate of the UE to another PDU session establishment request NAS message that is transmitted toward the AMF to establish another PDU session. The operations can further include receiving through the transceiver another AN specific resource setup message indicating whether the UE is to activate integrity protection for DRBs serving the another PDU session. The operations can further include summing DRB-IP rates that are allocated for the DRBs of the another PDU session that are indicated by the another AN specific resource setup message for the UE to activate integrity protection, to generate another session consumed DRB-IP rate. The operations can further include further adjusting the available DRB-IP rate of the UE based on a difference between the available DRB-IP rate of the UE and the another session consumed DRB-IP rate.

In additional or alternative embodiments, the operations can further include responsive to releasing the PDU session, increasing the available DRB-IP rate of the UE based on the session consumed DRB-IP rate of the PDU session.

In some embodiments, a method by a user equipment (UE) is provided for handling security policy for user plane protection of communications in a communications system. The method can include transmitting through the transceiver a packet data unit, PDU, session establishment request network access stratum, NAS, message toward an Access and Mobility Management Function (AMF) to establish a PDU session. The method can further include receiving through the transceiver an AN specific resource setup message indicating whether the UE is to activate integrity protection for data radio bearers, DRBs, serving the PDU session. The method can further include summing DRB Integrity Protected, DRB-IP, rates that are allocated for the DRBs of the PDU session that are indicated by the AN specific resource setup message for the UE to activate integrity protection, to generate a session consumed DRB-IP rate. The method can further include adjusting an available DRB-IP rate of the UE based on the session consumed DRB-IP rate.

In some embodiments, an Access and Mobility Management Function (AMF) of a communications system is provided. The AMF can include a network interface configured to communicate with user equipments (UEs) via a network and an access node, AN, of the communications system, and to communicate with a Session Management Function (SMF) of the communications system. The AMF can further include at least one processor configured to perform operations. The operations can include receiving a packet data unit, PDU, session establishment request network access stratum, NAS, message from a UE requesting establishment of a PDU session, the PDU session establishment request NAS message comprising an indication of an available data radio bearer integrity protected, DRB-IP, rate for which the UE presently has available computational capacity for processing DRBs that are integrity protected for the PDU session being established. The operations can further include communicating toward the SMF a PDU session create message containing the indication of the available DRB-IP rate. The operations can further include receiving a SMF message containing an indication of a user plane, UP, security policy for a PDU session being established. The operations can further include communicating a message containing the indication of the UP security policy to an access node (AN) that is communicating through a wireless air interface with the UE.

In some embodiments, a method by an Access and Mobility Management Function (AMF) of a communications system can be provided. The method can include receiving a packet data unit, PDU, session establishment request network access stratum, NAS, message from a user equipment (UE) requesting establishment of a PDU session, the PDU session establishment request NAS message comprising an indication of an available data radio bearer integrity protected, DRB-IP, rate for which the UE presently has available computational capacity for processing DRBs that are integrity protected for the PDU session being established. The method can further include communicating toward a Session Management Function (SMF) a PDU session create message containing the indication of the available DRB-IP rate of the UE. The method can further include receiving a SMF message containing an indication of a user plane, UP, security policy for a PDU session being established. The method can further include communicating a message containing the indication of the UP security policy to an access node (AN) that is communicating through a wireless air interface with the UE.

In some embodiments, a Session Management Function (SMF) of a communications system can be provided. The SMF can include a network interface configured to communicate with an Access and Mobility Management Function (AMF) of the communications system. The SMF can further include at least one processor configured to perform operations. The operations can include receiving from the AMF a packet data unit, PDU, session create message for a user equipment (UE) that is requesting establishment of a PDU session, the PDU session create message containing an indication of an available data radio bearer integrity protected, DRB-IP, rate for which the UE presently has available capacity for processing DRBs that are integrity protected for the PDU session being established. The operations can further include determining a user plane, UP, security policy for the PDU session based on the indication of the available DRB-IP rate for which the UE presently has available capacity. The operations can further include communicating to the AMF a message containing an indication of the UP security policy for the PDU session being established.

In a further embodiment, the operations to determine the UP security policy for the PDU session, can include determining whether the UE is to actively use integrity protection for at least some of the DRBs the UE will use for communication in the PDU session being established.

In some embodiments, a method by a Session Management Function (SMF) of a communications system can be provided. The method can include receiving from an Access and Mobility Management Function (AMF) a packet data unit, PDU, session create message for a user equipment (UE) that is requesting establishment of a PDU session, the PDU session create message containing an indication of an available data radio bearer integrity protected, DRB-IP, rate for which the UE presently has available capacity for processing DRBs that are integrity protected for the PDU session being established. The method can further include determining a user plane, UP, security policy for the PDU session based on the indication of the available DRB-IP rate for which the UE presently has available capacity. The method can further include communicating to the AMF a message containing an indication of the UP security policy for the PDU session being established.

In a further embodiment, the determination of the UP security policy for the PDU session can include determining whether the UE is to actively use integrity protection for at least some of the DRBs the UE will use for communication in the PDU session being established.

LISTING OF EXAMPLES EMBODIMENTS

Example Embodiments are discussed below. Reference numbers/letters are provided in parenthesis by way of example/illustration without limiting example embodiments to particular elements indicated by reference numbers/letters.

1. A user equipment (UE) for handling security policy for user plane protection of communications in a communications system, the UE comprising:
a transceiver configured to transmit and receive through a wireless air interface with an access node (AN) of the communications system; and
at least one processor connected to the transceiver and configured to perform operations comprising:
transmitting (810) through the transceiver a packet data unit, PDU, session establishment request network access stratum, NAS, message toward an Access and Mobility Management Function, AMF, to establish a PDU session;
receiving (820) through the transceiver an AN specific resource setup message indicating whether the UE is to activate integrity protection for data radio bearers, DRBs, serving the PDU session;
summing (830) DRB Integrity Protected, DRB-IP, rates that are allocated for the DRBs of the PDU session that are indicated by the AN specific resource setup message for the UE to activate integrity protection, to generate a session consumed DRB-IP rate; and
adjusting (840) an available DRB-IP rate of the UE based on the session consumed DRB-IP rate.

2. The UE of Embodiment 1, wherein:
generation of the session consumed DRB-IP rate comprises not including in the summing any DRB-IP rates that are allocated for DRBs of the PDU session that are not indicated by the AN specific resource setup message for the UE to activate integrity protection.

3. The UE of any of Embodiments 1 to 2, wherein:
when the PDU session will be the only active PDU session between the UE and the AN, the adjustment of the available DRB-IP rate of the UE comprises determining the available DRB-IP rate of the UE based on a difference between a maximum DRB-IP rate of the UE and the session consumed DRB-IP rate, wherein the maximum DRB-IP rate of the UE corresponds to a maximum computational capacity of the UE to process DRBs that are integrity protected during PDU sessions.

4. The UE of Embodiment 3, further comprising:
before transmitting the PDU session establishment request NAS message toward the AMF and when the UE does not have an active PDU session with the AN which has DRBs for which the UE provides integrity protection, adding (802) an indication of the maximum DRB-IP rate of the UE to the PDU session establishment request NAS message that is transmitted toward the AMF to establish a PDU session.

5. The UE of any of Embodiments 1 to 4, wherein:
when the PDU session is one of a plurality of active PDU sessions between the UE and the AN, the adjustment of the available DRB-IP rate of the UE comprises determining the available DRB-IP rate of the UE based on a difference between a maximum DRB-IP rate of the UE and a summation of the session consumed DRB-IP rates that have been generated for each of the active PDU sessions, wherein the maximum DRB-IP rate of the UE corresponds to a maximum computational capacity of the UE to process DRBs that are integrity protected during PDU sessions.

6. The UE of any of Embodiments 1 to 5, further comprising:
following the adjustment of the available DRB-IP rate of the UE, adding (850) the available DRB-IP rate of the UE to another PDU session establishment request NAS message that is transmitted toward the AMF to establish another PDU session;
receiving (860) through the transceiver another AN specific resource setup message indicating whether the UE is to activate integrity protection for DRBs serving the another PDU session;
summing (870) DRB-IP rates that are allocated for the DRBs of the another PDU session that are indicated by the another AN specific resource setup message for the UE to activate integrity protection, to generate another session consumed DRB-IP rate; and further adjusting (880) the available DRB-IP rate of the UE based on a difference between the available DRB-IP rate of the UE and the another session consumed DRB-IP rate.

7. The UE of any of Embodiments 1 to 6, further comprising:

responsive to releasing the PDU session, increasing (890) the available DRB-IP rate of the UE based on the session consumed DRB-IP rate of the PDU session.

8. A method by a user equipment (UE) for handling security policy for user plane protection of communications in a communications system, the method comprising:

transmitting (810) a packet data unit, PDU, session establishment request network access stratum, NAS, message toward an Access and Mobility Management Function (AMF) to establish a PDU session;

receiving (820) an AN specific resource setup message indicating whether the UE is to activate integrity protection for data radio bearers, DRBs, serving the PDU session;

summing (830) DRB Integrity Protected, DRB-IP, rates that are allocated for the DRBs of the PDU session that are indicated by the AN specific resource setup message for the UE to activate integrity protection, to generate a session consumed DRB-IP rate; and adjusting (840) an available DRB-IP rate of the UE based on the session consumed DRB-IP rate.

9. The method of Embodiment 8, further comprising performing the operations of any of Embodiments 2 to 7.

10. An Access and Mobility Management Function (AMF) of a communications system, the AMF comprising:

a network interface configured to communicate with user equipments (UEs) via a network and an access node, AN, of the communications system, and to communicate with a Session Management Function (SMF) of the communications system; and at least one processor configured to perform operations comprising:

receiving (910) a packet data unit, PDU, session establishment request network access stratum, NAS, message from a UE requesting establishment of a PDU session, the PDU session establishment request NAS message comprising an indication of an available data radio bearer integrity protected, DRB-IP, rate for which the UE presently has available computational capacity for processing DRBs that are integrity protected for the PDU session being established;

communicating (920) toward the SMF a PDU session create message containing the indication of the available DRB-IP rate;

receiving (930) a SMF message containing an indication of a user plane, UP, security policy for a PDU session being established; and communicating (940) a message containing the indication of the UP security policy to an access node, AN, that is communicating through a wireless air interface with the UE.

11. A method by an Access and Mobility Management Function (AMF) of a communications system, the method comprising:

receiving (910) a packet data unit, PDU, session establishment request network access stratum, NAS, message from a user equipment (UE) requesting establishment of a PDU session, the PDU session establishment request NAS message comprising an indication of an available data radio bearer integrity protected, DRB-IP, rate for which the UE presently has available computational capacity for processing DRBs that are integrity protected for the PDU session being established;

communicating (920) toward a Session Management Function (SMF) a PDU session create message containing the indication of the available DRB-IP rate of the UE;

receiving (930) a SMF message containing an indication of a user plane, UP, security policy for a PDU session being established; and communicating (940) a message containing the indication of the UP security policy to an access node, AN, that is communicating through a wireless air interface with the UE.

12. A Session Management Function (SMF) of a communications system, the SMF comprising:

a network interface configured to communicate with an Access and Mobility Management Function (AMF) of the communications system; and at least one processor configured to perform operations comprising:

receiving (1010) from the AMF a packet data unit, PDU, session create message for a user equipment (UE) that is requesting establishment of a PDU session, the PDU session create message containing an indication of an available data radio bearer integrity protected, DRB-IP, rate for which the UE presently has available capacity for processing DRBs that are integrity protected for the PDU session being established;

determining (1020) a user plane, UP, security policy for the PDU session based on the indication of the available DRB-IP rate for which the UE presently has available capacity; and communicating (1030) to the AMF a message containing an indication of the UP security policy for the PDU session being established.

13. The SMF of Embodiment 12, wherein the determination of the UP security policy for the PDU session comprises determining whether the UE is to actively use integrity protection for at least some of the DRBs the UE will use for communication in the PDU session being established.

14. A method by a Session Management Function (SMF) of a communications system, the method comprising:

receiving (1010) from an Access and Mobility Management Function (AMF) a packet data unit, PDU, session create message for a user equipment (UE) that is requesting establishment of a PDU session, the PDU session create message containing an indication of an available data radio bearer integrity protected, DRB-IP, rate for which the UE presently has available capacity for processing DRBs that are integrity protected for the PDU session being established;

determining (1020) a user plane, UP, security policy for the PDU session based on the indication of the available DRB-IP rate for which the UE presently has available capacity; and communicating (1030) to the AMF a message containing an indication of the UP security policy for the PDU session being established.

15. The method of Embodiment 14, wherein the determination of the UP security policy for the PDU session comprises determining whether the UE is to actively use integrity protection for at least some of the DRBs the UE will use for communication in the PDU session being established.

Further Definitions and Embodiments are Discussed Below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components, or functions but does not preclude the presence or addition of one or more other features, integers, elements, steps, components, functions, or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

Additional Explanation is Provided Below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 11:
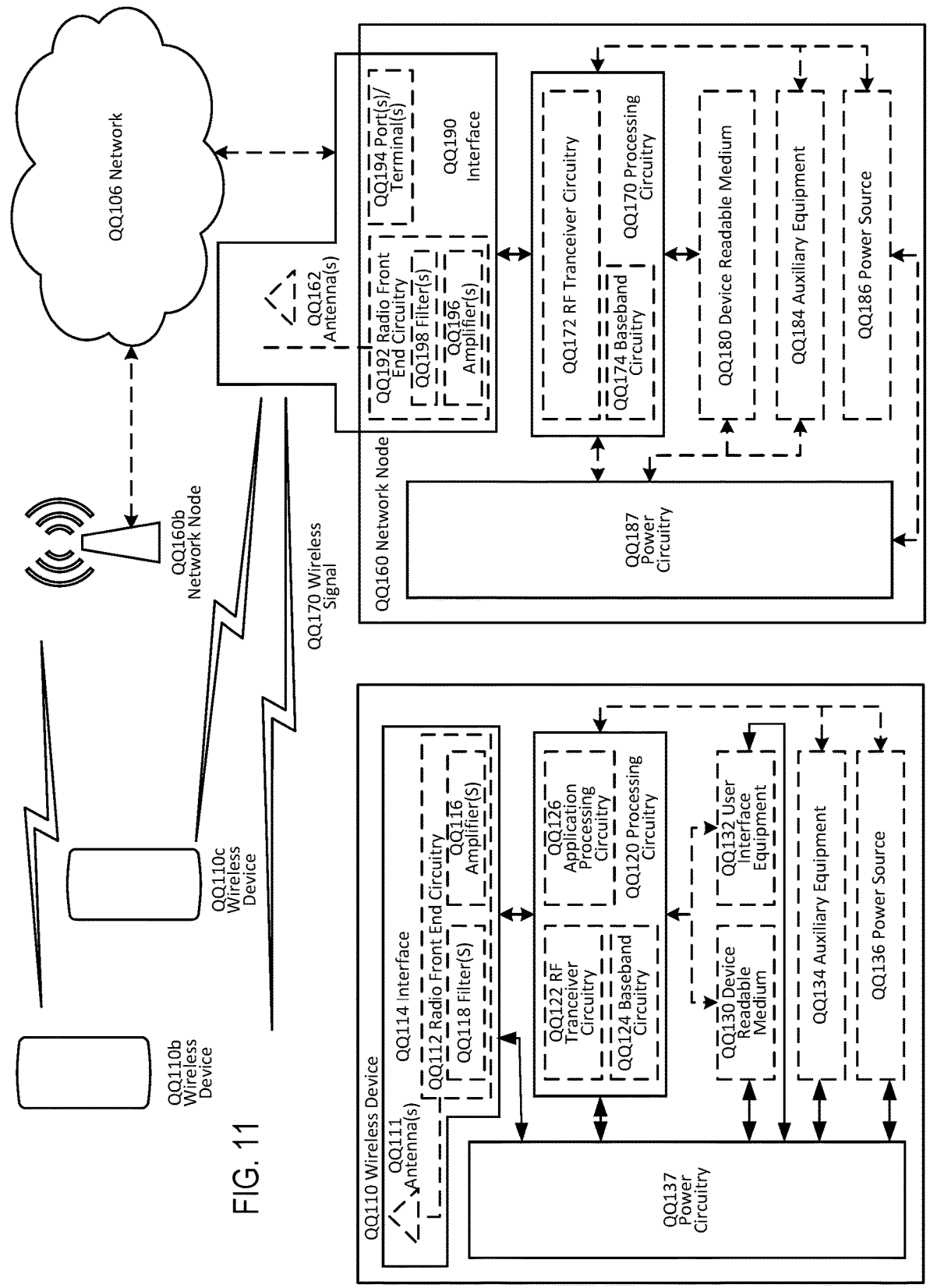
FIG. 11 is a block diagram of a wireless network in accordance with some embodiments.

FIG. 11: A wireless network in accordance with some embodiments.

Although the subject matter described herein may be implemented in any appropriate type of system using any suitable components, the embodiments disclosed herein are described in relation to a wireless network, such as the example wireless network illustrated in FIG. 11. For simplicity, the wireless network of FIG. 11 only depicts network QQ106, network nodes QQ160 and QQ160b, and WDs QQ110, QQ110b, and QQ110c (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node QQ160 and wireless device (WD) QQ110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network QQ106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node QQ160 and WD QQ110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 11, network node QQ160 includes processing circuitry QQ170, device readable medium QQ180, interface QQ190, auxiliary equipment QQ184, power source QQ186, power circuitry QQ187, and antenna QQ162. Although network node QQ160 illustrated in the example wireless network of FIG. 11 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node QQ160 are depicted as single boxes located within a larger box, or nested within multiple boxes, in practice, a network node may comprise multiple different physical components that make up a single illustrated component (e.g., device readable medium QQ180 may comprise multiple separate hard drives as well as multiple RAM modules).

Similarly, network node QQ160 may be composed of multiple physically separate components (e.g., a NodeB component and a RNC component, or a BTS component and a BSC component, etc.), which may each have their own respective components. In certain scenarios in which network node QQ160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node QQ160 may be configured to support multiple radio access technologies (RATs). In such embodiments, some components may be duplicated (e.g., separate device readable medium QQ180 for the different RATs) and some components may be reused (e.g., the same antenna QQ162 may be shared by the RATs). Network node QQ160 may also include multiple sets of the various illustrated components for different wireless technologies integrated into network node QQ160, such as, for example, GSM, WCDMA, LTE, NR, WiFi, or Bluetooth wireless technologies. These wireless technologies may be integrated into the same or different chip or set of chips and other components within network node QQ160.

Processing circuitry QQ170 is configured to perform any determining, calculating, or similar operations (e.g., certain obtaining operations) described herein as being provided by a network node. These operations performed by processing circuitry QQ170 may include processing information obtained by processing circuitry QQ170 by, for example, converting the obtained information into other information, comparing the obtained information or converted information to information stored in the network node, and/or performing one or more operations based on the obtained information or converted information, and as a result of said processing making a determination.

Processing circuitry QQ170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node QQ160 components, such as device readable medium QQ180, network node QQ160 functionality. For example, processing circuitry QQ170 may execute instructions stored in device readable medium QQ180 or in memory within processing circuitry QQ170. Such functionality may include providing any of the various wireless features, functions, or benefits discussed herein. In some embodiments, processing circuitry QQ170 may include a system on a chip (SOC).

In some embodiments, processing circuitry QQ170 may include one or more of radio frequency (RF) transceiver circuitry QQ172 and baseband processing circuitry QQ174. In some embodiments, radio frequency (RF) transceiver circuitry QQ172 and baseband processing circuitry QQ174 may be on separate chips (or sets of chips), boards, or units, such as radio units and digital units. In alternative embodiments, part or all of RF transceiver circuitry QQ172 and baseband processing circuitry QQ174 may be on the same chip or set of chips, boards, or units.

In certain embodiments, some or all of the functionality described herein as being provided by a network node, base station, eNB or other such network device may be performed by processing circuitry QQ170 executing instructions stored on device readable medium QQ180 or memory within processing circuitry QQ170. In alternative embodiments, some or all of the functionality may be provided by processing circuitry QQ170 without executing instructions stored on a separate or discrete device readable medium, such as in a hard-wired manner. In any of those embodiments, whether executing instructions stored on a device readable storage medium or not, processing circuitry QQ170 can be configured to perform the described functionality. The benefits provided by such functionality are not limited to processing circuitry QQ170 alone or to other components of network node QQ160, but are enjoyed by network node QQ160 as a whole, and/or by end users and the wireless network generally.

Device readable medium QQ180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry QQ170. Device readable medium QQ180 may store any suitable instructions, data or information, including a computer program, software, an application including one or more of logic, rules, code, tables, etc. and/or other instructions capable of being executed by processing circuitry QQ170 and, utilized by network node QQ160. Device readable medium QQ180 may be used to store any calculations made by processing circuitry QQ170 and/or any data received via interface QQ190. In some embodiments, processing circuitry QQ170 and device readable medium QQ180 may be considered to be integrated.

Interface QQ190 is used in the wired or wireless communication of signalling and/or data between network node QQ160, network QQ106, and/or WDs QQ110. As illustrated, interface QQ190 comprises port(s)/terminal(s) QQ194 to send and receive data, for example to and from network QQ106 over a wired connection. Interface QQ190 also includes radio front end circuitry QQ192 that may be coupled to, or in certain embodiments a part of, antenna QQ162. Radio front end circuitry QQ192 comprises filters QQ198 and amplifiers QQ196. Radio front end circuitry QQ192 may be connected to antenna QQ162 and processing circuitry QQ170. Radio front end circuitry may be configured to condition signals communicated between antenna QQ162 and processing circuitry QQ170. Radio front end circuitry QQ192 may receive digital data that is to be sent out to other network nodes or WDs via a wireless connection. Radio front end circuitry QQ192 may convert the digital data into a radio signal having the appropriate channel and bandwidth parameters using a combination of filters QQ198 and/or amplifiers QQ196. The radio signal may then be transmitted via antenna QQ162. Similarly, when receiving data, antenna QQ162 may collect radio signals which are then converted into digital data by radio front end circuitry QQ192. The digital data may be passed to processing circuitry QQ170. In other embodiments, the interface may comprise different components and/or different combinations of components.

In certain alternative embodiments, network node QQ160 may not include separate radio front end circuitry QQ192, instead, processing circuitry QQ170 may comprise radio front end circuitry and may be connected to antenna QQ162 without separate radio front end circuitry QQ192. Similarly, in some embodiments, all or some of RF transceiver circuitry QQ172 may be considered a part of interface QQ190. In still other embodiments, interface QQ190 may include one or more ports or terminals QQ194, radio front end circuitry QQ192, and RF transceiver circuitry QQ172, as part of a radio unit (not shown), and interface QQ190 may communicate with baseband processing circuitry QQ174, which is part of a digital unit (not shown).

Antenna QQ162 may include one or more antennas, or antenna arrays, configured to send and/or receive wireless signals. Antenna QQ162 may be coupled to radio front end circuitry QQ190 and may be any type of antenna capable of transmitting and receiving data and/or signals wirelessly. In some embodiments, antenna QQ162 may comprise one or more omni-directional, sector or panel antennas operable to transmit/receive radio signals between, for example, 2 GHz and 66 GHZ. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna QQ162 may be separate from network node QQ160 and may be connectable to network node QQ160 through an interface or port.

Antenna QQ162, interface QQ190, and/or processing circuitry QQ170 may be configured to perform any receiving operations and/or certain obtaining operations described herein as being performed by a network node. Any information, data and/or signals may be received from a wireless device, another network node and/or any other network equipment. Similarly, antenna QQ162, interface QQ190, and/or processing circuitry QQ170 may be configured to perform any transmitting operations described herein as being performed by a network node. Any information, data and/or signals may be transmitted to a wireless device, another network node and/or any other network equipment.

Power circuitry QQ187 may comprise, or be coupled to, power management circuitry and is configured to supply the components of network node QQ160 with power for performing the functionality described herein. Power circuitry QQ187 may receive power from power source QQ186. Power source QQ186 and/or power circuitry QQ187 may be configured to provide power to the various components of network node QQ160 in a form suitable for the respective components (e.g., at a voltage and current level needed for each respective component). Power source QQ186 may either be included in, or external to, power circuitry QQ187 and/or network node QQ160. For example, network node QQ160 may be connectable to an external power source (e.g., an electricity outlet) via an input circuitry or interface such as an electrical cable, whereby the external power source supplies power to power circuitry QQ187. As a further example, power source QQ186 may comprise a source of power in the form of a battery or battery pack which is connected to, or integrated in, power circuitry QQ187. The battery may provide backup power should the external power source fail. Other types of power sources, such as photovoltaic devices, may also be used.

Alternative embodiments of network node QQ160 may include additional components beyond those shown in FIG. 11 that may be responsible for providing certain aspects of the network node's functionality, including any of the functionality described herein and/or any functionality necessary to support the subject matter described herein. For example, network node QQ160 may include user interface equipment to allow input of information into network node QQ160 and to allow output of information from network node QQ160. This may allow a user to perform diagnostic, maintenance, repair, and other administrative functions for network node QQ160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device QQ110 includes antenna QQ111, interface QQ114, processing circuitry QQ120, device readable medium QQ130, user interface equipment QQ132, auxiliary equipment QQ134, power source QQ136 and power circuitry QQ137. WD QQ110 may include multiple sets of one or more of the illustrated components for different wireless technologies supported by WD QQ110, such as, for example, GSM, WCDMA, LTE, NR, WiFi, WiMAX, or Bluetooth wireless technologies, just to mention a few. These wireless technologies may be integrated into the same or different chips or set of chips as other components within WD QQ110.

Antenna QQ111 may include one or more antennas or antenna arrays, configured to send and/or receive wireless signals, and is connected to interface QQ114. In certain alternative embodiments, antenna QQ111 may be separate from WD QQ110 and be connectable to WD QQ110 through an interface or port. Antenna QQ111, interface QQ114, and/or processing circuitry QQ120 may be configured to perform any receiving or transmitting operations described herein as being performed by a WD. Any information, data and/or signals may be received from a network node and/or another WD. In some embodiments, radio front end circuitry and/or antenna QQ111 may be considered an interface.

As illustrated, interface QQ114 comprises radio front end circuitry QQ112 and antenna QQ111. Radio front end circuitry QQ112 comprise one or more filters QQ118 and amplifiers QQ116. Radio front end circuitry QQ114 is connected to antenna QQ111 and processing circuitry QQ120, and is configured to condition signals communicated between antenna QQ111 and processing circuitry QQ120. Radio front end circuitry QQ112 may be coupled to or a part of antenna QQ111. In some embodiments, WD QQ110 may not include separate radio front end circuitry QQ112; rather, processing circuitry QQ120 may comprise radio front end circuitry and may be connected to antenna QQ111. Similarly, in some embodiments, some or all of RF transceiver circuitry QQ122 may be considered a part of interface QQ114. Radio front end circuitry QQ112 may receive digital data that is to be sent out to other network nodes or WDs via a wireless connection. Radio front end circuitry QQ112 may convert the digital data into a radio signal having the appropriate channel and bandwidth parameters using a combination of filters QQ118 and/or amplifiers QQ116. The radio signal may then be transmitted via antenna QQ111. Similarly, when receiving data, antenna QQ111 may collect radio signals which are then converted into digital data by radio front end circuitry QQ112. The digital data may be passed to processing circuitry QQ120. In other embodiments, the interface may comprise different components and/or different combinations of components.

Processing circuitry QQ120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD QQ110 components, such as device readable medium QQ130, WD QQ110 functionality. Such functionality may include providing any of the various wireless features or benefits discussed herein. For example, processing circuitry QQ120 may execute instructions stored in device readable medium QQ130 or in memory within processing circuitry QQ120 to provide the functionality disclosed herein.

As illustrated, processing circuitry QQ120 includes one or more of RF transceiver circuitry QQ122, baseband processing circuitry QQ124, and application processing circuitry QQ126. In other embodiments, the processing circuitry may comprise different components and/or different combinations of components. In certain embodiments processing circuitry QQ120 of WD QQ110 may comprise a SOC. In some embodiments, RF transceiver circuitry QQ122, baseband processing circuitry QQ124, and application processing circuitry QQ126 may be on separate chips or sets of chips. In alternative embodiments, part or all of baseband processing circuitry QQ124 and application processing circuitry QQ126 may be combined into one chip or set of chips, and RF transceiver circuitry QQ122 may be on a separate chip or set of chips. In still alternative embodiments, part or all of RF transceiver circuitry QQ122 and baseband processing circuitry QQ124 may be on the same chip or set of chips, and application processing circuitry QQ126 may be on a separate chip or set of chips. In yet other alternative embodiments, part or all of RF transceiver circuitry QQ122, baseband processing circuitry QQ124, and application processing circuitry QQ126 may be combined in the same chip or set of chips. In some embodiments, RF transceiver circuitry QQ122 may be a part of interface QQ114. RF transceiver circuitry QQ122 may condition RF signals for processing circuitry QQ120.

In certain embodiments, some or all of the functionality described herein as being performed by a WD may be provided by processing circuitry QQ120 executing instructions stored on device readable medium QQ130, which in certain embodiments may be a computer-readable storage medium. In alternative embodiments, some or all of the functionality may be provided by processing circuitry QQ120 without executing instructions stored on a separate or discrete device readable storage medium, such as in a hard-wired manner. In any of those particular embodiments, whether executing instructions stored on a device readable storage medium or not, processing circuitry QQ120 can be configured to perform the described functionality. The benefits provided by such functionality are not limited to processing circuitry QQ120 alone or to other components of WD QQ110, but are enjoyed by WD QQ110 as a whole, and/or by end users and the wireless network generally.

Processing circuitry QQ120 may be configured to perform any determining, calculating, or similar operations (e.g., certain obtaining operations) described herein as being performed by a WD. These operations, as performed by processing circuitry QQ120, may include processing information obtained by processing circuitry QQ120 by, for example, converting the obtained information into other information, comparing the obtained information or converted information to information stored by WD QQ110, and/or performing one or more operations based on the obtained information or converted information, and as a result of said processing making a determination.

Device readable medium QQ130 may be operable to store a computer program, software, an application including one or more of logic, rules, code, tables, etc. and/or other instructions capable of being executed by processing circuitry QQ120. Device readable medium QQ130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/ or computer executable memory devices that store information, data, and/or instructions that may be used by processing circuitry QQ120. In some embodiments, processing circuitry QQ120 and device readable medium QQ130 may be considered to be integrated. User interface equipment QQ132 may provide components that allow for a human user to interact with WD QQ110. Such interaction may be of many forms, such as visual, audial, tactile, etc. User interface equipment QQ132 may be operable to produce output to the user and to allow the user to provide input to WD QQ110. The type of interaction may vary depending on the type of user interface equipment QQ132 installed in WD QQ110. For example, if WD QQ110 is a smart phone, the interaction may be via a touch screen; if WD QQ110 is a smart meter, the interaction may be through a screen that provides usage (e.g., the number of gallons used) or a speaker that provides an audible alert (e.g., if smoke is detected). User interface equipment QQ132 may include input interfaces, devices and circuits, and output interfaces, devices and circuits. User interface equipment QQ132 is configured to allow input of information into WD QQ110, and is connected to processing circuitry QQ120 to allow processing circuitry QQ120 to process the input information. User interface equipment QQ132 may include, for example, a microphone, a proximity or other sensor, keys/buttons, a touch display, one or more cameras, a USB port, or other input circuitry. User interface equipment QQ132 is also configured to allow output of information from WD QQ110, and to allow processing circuitry QQ120 to output information from WD QQ110. User interface equipment QQ132 may include, for example, a speaker, a display, vibrating circuitry, a USB port, a headphone interface, or other output circuitry. Using one or more input and output interfaces, devices, and circuits, of user interface equipment QQ132, WD QQ110 may communicate with end users and/or the wireless network, and allow them to benefit from the functionality described herein.

Auxiliary equipment QQ134 is operable to provide more specific functionality which may not be generally performed by WDs. This may comprise specialized sensors for doing measurements for various purposes, interfaces for additional types of communication such as wired communications etc. The inclusion and type of components of auxiliary equipment QQ134 may vary depending on the embodiment and/or scenario.

Power source QQ136 may, in some embodiments, be in the form of a battery or battery pack. Other types of power sources, such as an external power source (e.g., an electricity outlet), photovoltaic devices or power cells, may also be used. WD QQ110 may further comprise power circuitry QQ137 for delivering power from power source QQ136 to the various parts of WD QQ110 which need power from power source QQ136 to carry out any functionality described or indicated herein. Power circuitry QQ137 may in certain embodiments comprise power management circuitry. Power circuitry QQ137 may additionally or alternatively be operable to receive power from an external power source; in which case WD QQ110 may be connectable to the external power source (such as an electricity outlet) via input circuitry or an interface such as an electrical power cable. Power circuitry QQ137 may also in certain embodiments be operable to deliver power from an external power source to power source QQ136. This may be, for example, for the charging of power source QQ136. Power circuitry QQ137 may perform any formatting, converting, or other modification to the power from power source QQ136 to make the power suitable for the respective components of WD QQ110 to which power is supplied.

Figure 12:
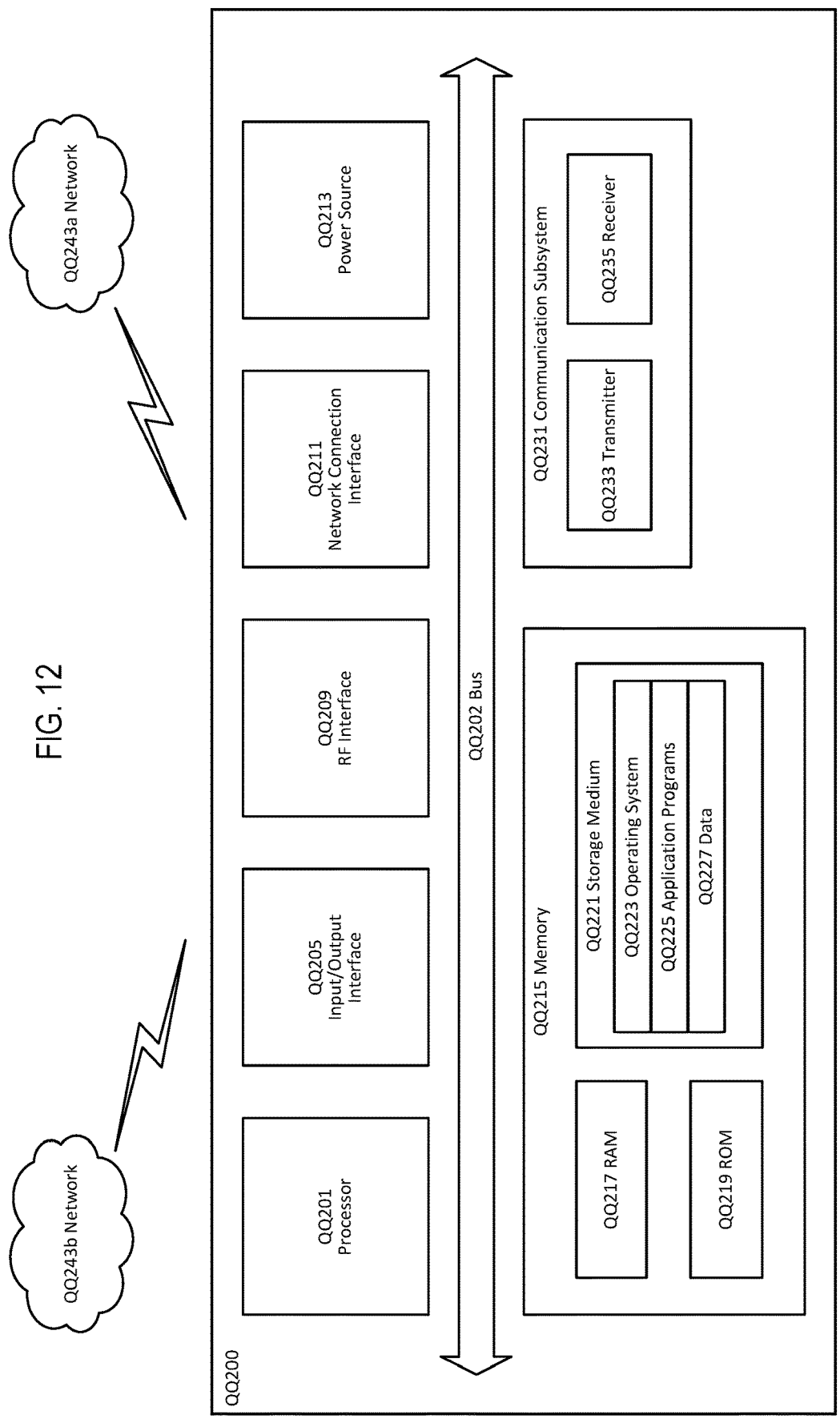
FIG. 12 is a block diagram of a user equipment in accordance with some embodiments.

FIG. 12: User Equipment in accordance with some embodiments.

FIG. 12 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE QQ2200 may be any UE identified by the 3rd Generation Partnership Project (3GPP), including a NB-IoT UE, a machine type communication (MTC) UE, and/or an enhanced MTC (eMTC) UE. UE QQ200, as illustrated in FIG. 12, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 12 is a UE, the components discussed herein are equally applicable to a WD, and vice-versa.

In FIG. 12, UE QQ200 includes processing circuitry QQ201 that is operatively coupled to input/output interface QQ205, radio frequency (RF) interface QQ209, network connection interface QQ211, memory QQ215 including random access memory (RAM) QQ217, read-only memory (ROM) QQ219, and storage medium QQ221 or the like, communication subsystem QQ231, power source QQ233, and/or any other component, or any combination thereof. Storage medium QQ221 includes operating system QQ223, application program QQ225, and data QQ227. In other embodiments, storage medium QQ221 may include other similar types of information. Certain UEs may utilize all of the components shown in FIG. 12, or only a subset of the components. The level of integration between the components may vary from one UE to another UE. Further, certain UEs may contain multiple instances of a component, such as multiple processors, memories, transceivers, transmitters, receivers, etc.

In FIG. 12, processing circuitry QQ201 may be configured to process computer instructions and data. Processing circuitry QQ201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry QQ201 may include two central processing units (CPUs). Data may be information in a form suitable for use by a computer.

In the depicted embodiment, input/output interface QQ205 may be configured to provide a communication interface to an input device, output device, or input and output device. UE QQ200 may be configured to use an output device via input/output interface QQ205. An output device may use the same type of interface port as an input device. For example, a USB port may be used to provide input to and output from UE QQ200. The output device may be a speaker, a sound card, a video card, a display, a monitor, a printer, an actuator, an emitter, a smartcard, another output device, or any combination thereof. UE QQ200 may be configured to use an input device via input/output interface QQ205 to allow a user to capture information into UE QQ200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 12, RF interface QQ209 may be configured to provide a communication interface to RF components such as a transmitter, a receiver, and an antenna. Network connection interface QQ211 may be configured to provide a communication interface to network QQ243a. Network QQ243a may encompass wired and/or wireless networks such as a local-area network (LAN), a wide-area network (WAN), a computer network, a wireless network, a telecommunications network, another like network or any combination thereof. For example, network QQ243a may comprise a Wi-Fi network. Network connection interface QQ211 may be configured to include a receiver and a transmitter interface used to communicate with one or more other devices over a communication network according to one or more communication protocols, such as Ethernet, TCP/IP, SONET, ATM, or the like. Network connection interface QQ211 may implement receiver and transmitter functionality appropriate to the communication network links (e.g., optical, electrical, and the like). The transmitter and receiver functions may share circuit components, software or firmware, or alternatively may be implemented separately.

RAM QQ217 may be configured to interface via bus QQ202 to processing circuitry QQ201 to provide storage or caching of data or computer instructions during the execution of software programs such as the operating system, application programs, and device drivers. ROM QQ219 may be configured to provide computer instructions or data to processing circuitry QQ201. For example, ROM QQ219 may be configured to store invariant low-level system code or data for basic system functions such as basic input and output (I/O), startup, or reception of keystrokes from a keyboard that are stored in a non-volatile memory. Storage medium QQ221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium QQ221 may be configured to include operating system QQ223, application program QQ225 such as a web browser application, a widget or gadget engine or another application, and data file QQ227. Storage medium QQ221 may store, for use by UE QQ200, any of a variety of various operating systems or combinations of operating systems.

Storage medium QQ221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium QQ221 may allow UE QQ200 to access computer-executable instructions, application programs or the like, stored on transitory or non-transitory memory media, to off-load data, or to upload data. An article of manufacture, such as one utilizing a communication system may be tangibly embodied in storage medium QQ221, which may comprise a device readable medium.

In FIG. 12, processing circuitry QQ201 may be configured to communicate with network QQ243b using communication subsystem QQ231. Network QQ243a and network QQ243b may be the same network or networks or different network or networks. Communication subsystem QQ231 may be configured to include one or more transceivers used to communicate with network QQ243b. For example, communication subsystem QQ231 may be configured to include one or more transceivers used to communicate with one or more remote transceivers of another device capable of wireless communication such as another WD, UE, or base station of a radio access network (RAN) according to one or more communication protocols, such as IEEE 802.QQ2, CDMA, WCDMA, GSM, LTE, UTRAN, WiMax, or the like. Each transceiver may include transmitter QQ233 and/or receiver QQ235 to implement transmitter or receiver functionality, respectively, appropriate to the RAN links (e.g., frequency allocations and the like). Further, transmitter QQ233 and receiver QQ235 of each transceiver may share circuit components, software or firmware, or alternatively may be implemented separately.

In the illustrated embodiment, the communication functions of communication subsystem QQ231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem QQ231 may include cellular communication, Wi-Fi communication, Bluetooth communication, and GPS communication. Network QQ243b may encompass wired and/or wireless networks such as a local-area network (LAN), a wide-area network (WAN), a computer network, a wireless network, a telecommunications network, another like network or any combination thereof. For example, network QQ243b may be a cellular network, a Wi-Fi network, and/or a near-field network. Power source QQ213 may be configured to provide alternating current (AC) or direct current (DC) power to components of UE QQ200.

The features, benefits and/or functions described herein may be implemented in one of the components of UE QQ200 or partitioned across multiple components of UE QQ200. Further, the features, benefits, and/or functions described herein may be implemented in any combination of hardware, software or firmware. In one example, communication subsystem QQ231 may be configured to include any of the components described herein. Further, processing circuitry QQ201 may be configured to communicate with any of such components over bus QQ202. In another example, any of such components may be represented by program instructions stored in memory that when executed by processing circuitry QQ201 perform the corresponding functions described herein. In another example, the functionality of any of such components may be partitioned between processing circuitry QQ201 and communication subsystem QQ231. In another example, the non-computationally intensive functions of any of such components may be implemented in software or firmware and the computationally intensive functions may be implemented in hardware.

Figure 13:
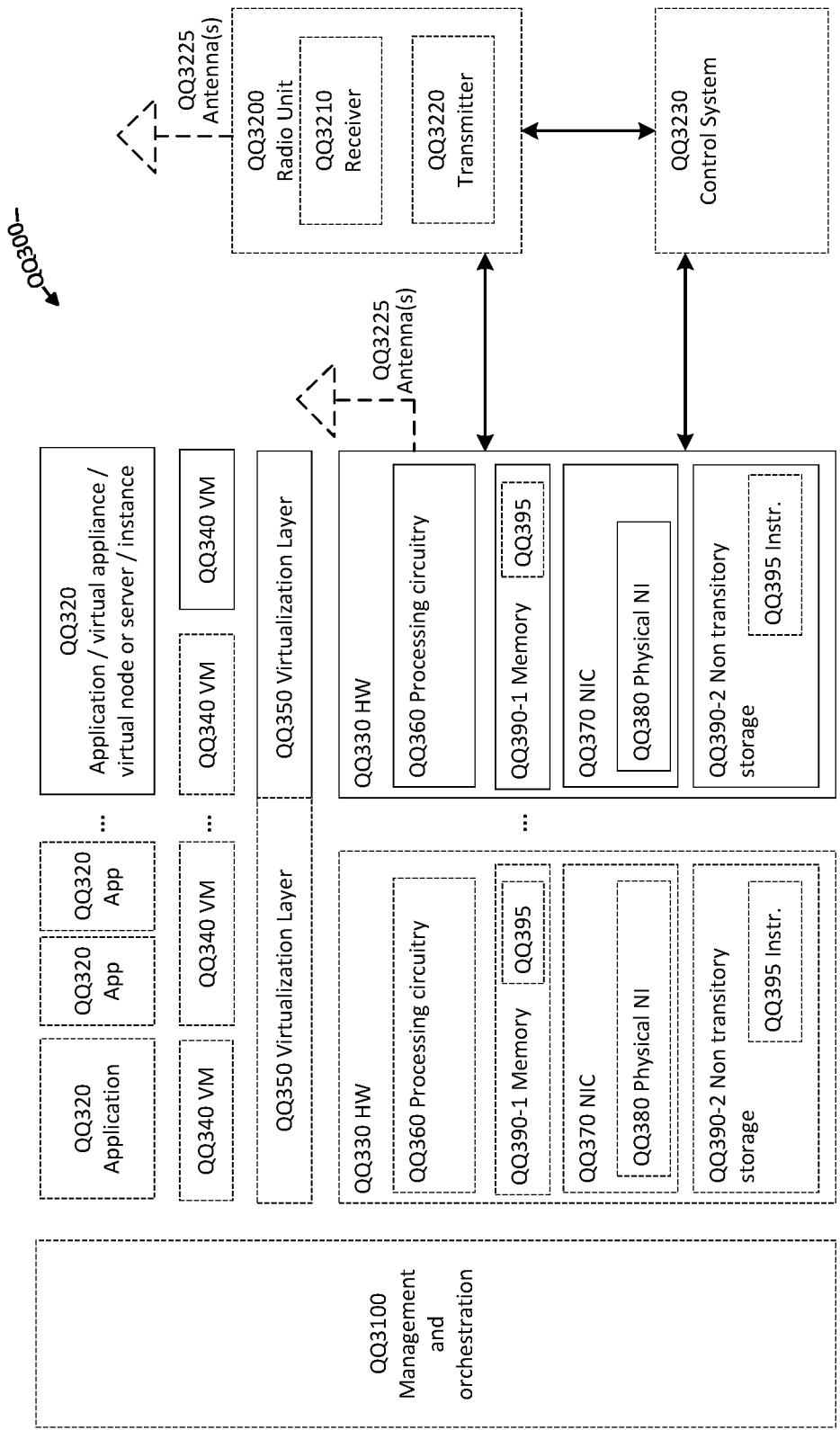
FIG. 13 is a block diagram of a virtualization environment in accordance with some embodiments.

FIG. 13: Virtualization environment in accordance with some embodiments.

FIG. 13 is a schematic block diagram illustrating a virtualization environment QQ300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments QQ300 hosted by one or more of hardware nodes QQ330. Further, in embodiments in which the virtual node is not a radio access node or does not require radio connectivity (e.g., a core network node), then the network node may be entirely virtualized.

The functions may be implemented by one or more applications QQ320 (which may alternatively be called software instances, virtual appliances, network functions, virtual nodes, virtual network functions, etc.) operative to implement some of the features, functions, and/or benefits of some of the embodiments disclosed herein. Applications QQ320 are run in virtualization environment QQ300 which provides hardware QQ330 comprising processing circuitry QQ360 and memory QQ390. Memory QQ390 contains instructions QQ395 executable by processing circuitry QQ360 whereby application QQ320 is operative to provide one or more of the features, benefits, and/or functions disclosed herein.

Virtualization environment QQ300, comprises general-purpose or special-purpose network hardware devices QQ330 comprising a set of one or more processors or processing circuitry QQ360, which may be commercial off-the-shelf (COTS) processors, dedicated Application Specific Integrated Circuits (ASICs), or any other type of processing circuitry including digital or analog hardware components or special purpose processors. Each hardware device may comprise memory QQ390-1 which may be non-persistent memory for temporarily storing instructions QQ395 or software executed by processing circuitry QQ360. Each hardware device may comprise one or more network interface controllers (NICs) QQ370, also known as network interface cards, which include physical network interface QQ380. Each hardware device may also include non-transitory, persistent, machine-readable storage media QQ390-2 having stored therein software QQ395 and/or instructions executable by processing circuitry QQ360. Software QQ395 may include any type of software including software for instantiating one or more virtualization layers QQ350 (also referred to as hypervisors), software to execute virtual machines QQ340 as well as software allowing it to execute functions, features and/or benefits described in relation with some embodiments described herein.

Virtual machines QQ340, comprise virtual processing, virtual memory, virtual networking or interface and virtual storage, and may be run by a corresponding virtualization layer QQ350 or hypervisor. Different embodiments of the instance of virtual appliance QQ320 may be implemented on one or more of virtual machines QQ340, and the implementations may be made in different ways.

During operation, processing circuitry QQ360 executes software QQ395 to instantiate the hypervisor or virtualization layer QQ350, which may sometimes be referred to as a virtual machine monitor (VMM). Virtualization layer QQ350 may present a virtual operating platform that appears like networking hardware to virtual machine QQ340.

As shown in FIG. 13, hardware QQ330 may be a stand-alone network node with generic or specific components. Hardware QQ330 may comprise antenna QQ3225 and may implement some functions via virtualization. Alternatively, hardware QQ330 may be part of a larger cluster of hardware (e.g. such as in a data center or customer premise equipment (CPE)) where many hardware nodes work together and are managed via management and orchestration (MANO) QQ3100, which, among others, oversees lifecycle management of applications QQ320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine QQ340 may be a software implementation of a physical machine that runs programs as if they were executing on a physical, non-virtualized machine. Each of virtual machines QQ340, and that part of hardware QQ330 that executes that virtual machine, be it hardware dedicated to that virtual machine and/or hardware shared by that virtual machine with others of the virtual machines QQ340, forms a separate virtual network elements (VNE).

Still in the context of NFV, Virtual Network Function (VNF) is responsible for handling specific network functions that run in one or more virtual machines QQ340 on top of hardware networking infrastructure QQ330 and corresponds to application QQ320 in FIG. 13.

In some embodiments, one or more radio units QQ3200 that each include one or more transmitters QQ3220 and one or more receivers QQ3210 may be coupled to one or more antennas QQ3225. Radio units QQ3200 may communicate directly with hardware nodes QQ330 via one or more appropriate network interfaces and may be used in combination with the virtual components to provide a virtual node with radio capabilities, such as a radio access node or a base station.

In some embodiments, some signalling can be effected with the use of control system QQ3230 which may alternatively be used for communication between the hardware nodes QQ330 and radio units QQ3200.

Figure 14:
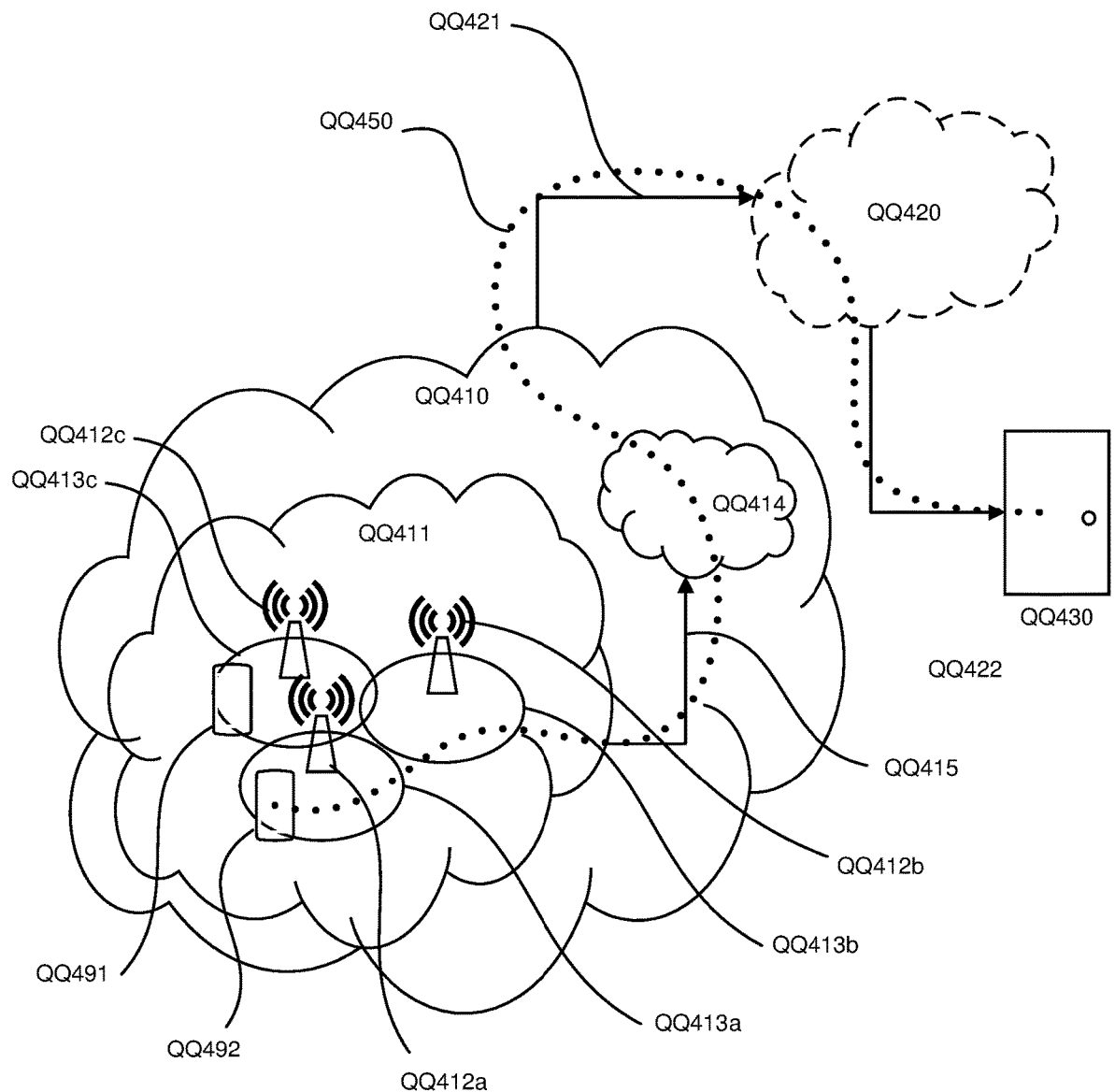
FIG. 14 is a block diagram of a telecommunication network connected via an intermediate network to a host computer in accordance with some embodiments.

FIG. 14: Telecommunication network connected via an intermediate network to a host computer in accordance with some embodiments.

With reference to FIG. 14, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 14 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Figure 15:
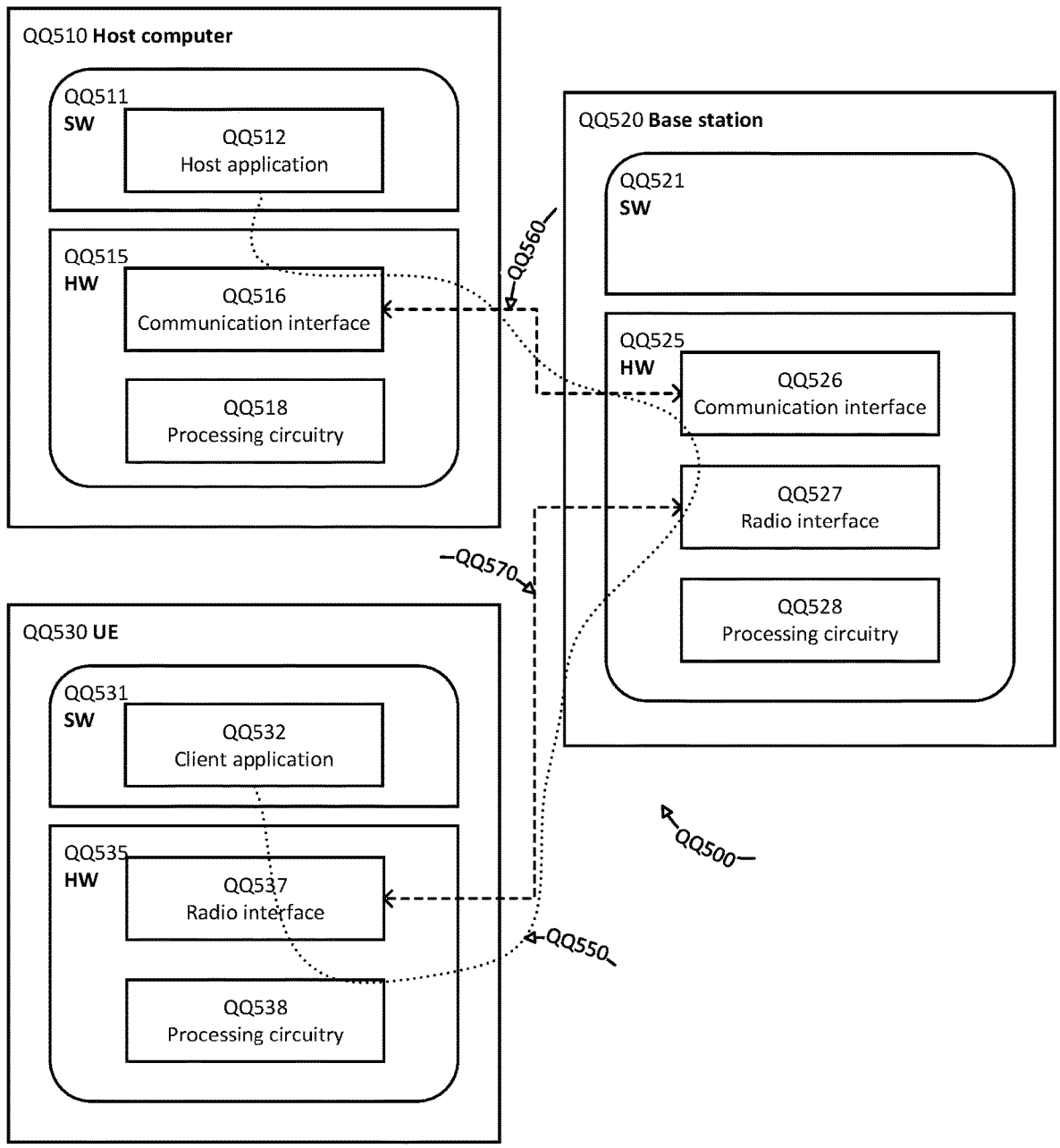
FIG. 15 is a block diagram of a host computer communicating via a base station with a user equipment over a partially wireless connection in accordance with some embodiments.

FIG. 15: Host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 15. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 15) served by base station QQ520. Communication interface QQ526 may be configured to facilitate connection QQ560 to host computer QQ510. Connection QQ560 may be direct or it may pass through a core network (not shown in FIG. 15) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

It is noted that host computer QQ510, base station QQ520 and UE QQ530 illustrated in FIG. 15 may be similar or identical to host computer QQ430, one of base stations QQ412a, QQ412b, QQ412c and one of UEs QQ491, QQ492 of FIG. 14, respectively. This is to say, the inner workings of these entities may be as shown in FIG. 15 and independently, the surrounding network topology may be that of FIG. 14.

In FIG. 15, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments may improve the performance of OTT services provided to UE QQ530 using OTT connection QQ550, in which wireless connection QQ570 forms the last segment. More precisely, the teachings of these embodiments may improve the deblock filtering for video processing and thereby provide benefits such as improved video encoding and/or decoding.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 16:
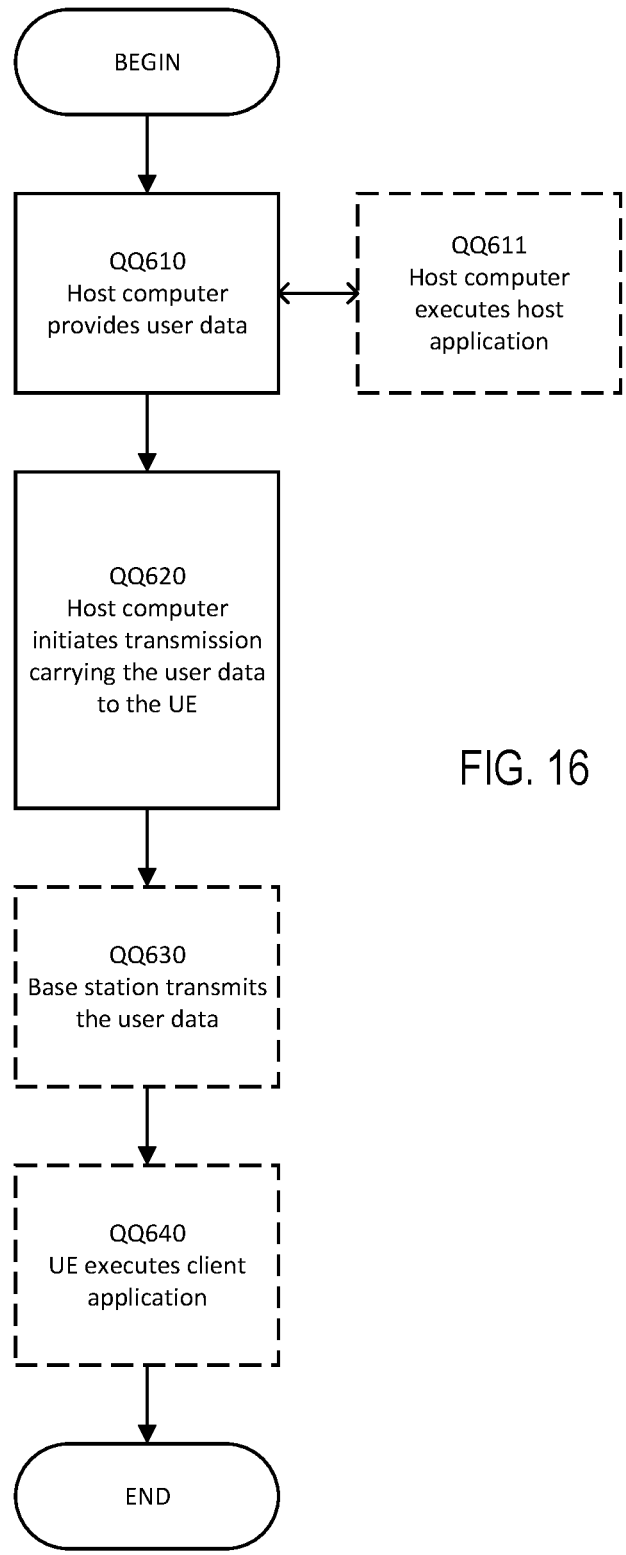
FIG. 16 is a block diagram of methods implemented in a communication system including a host computer, a base station, and a user equipment in accordance with some embodiments.

FIG. 16: Methods implemented in a communication system including a host computer, a base station and a user equipment in accordance with some embodiments.

FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 17:
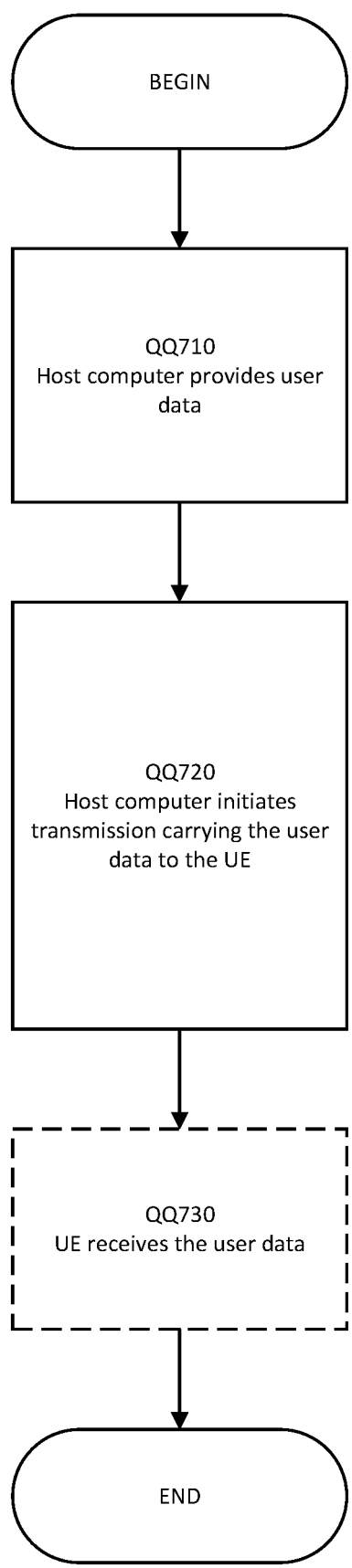
FIG. 17 is a block diagram of methods implemented in a communication system including a host computer, a base station, and a user equipment in accordance with some embodiments.

FIG. 17: Methods implemented in a communication system including a host computer, a base station and a user equipment in accordance with some embodiments.

FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 18:
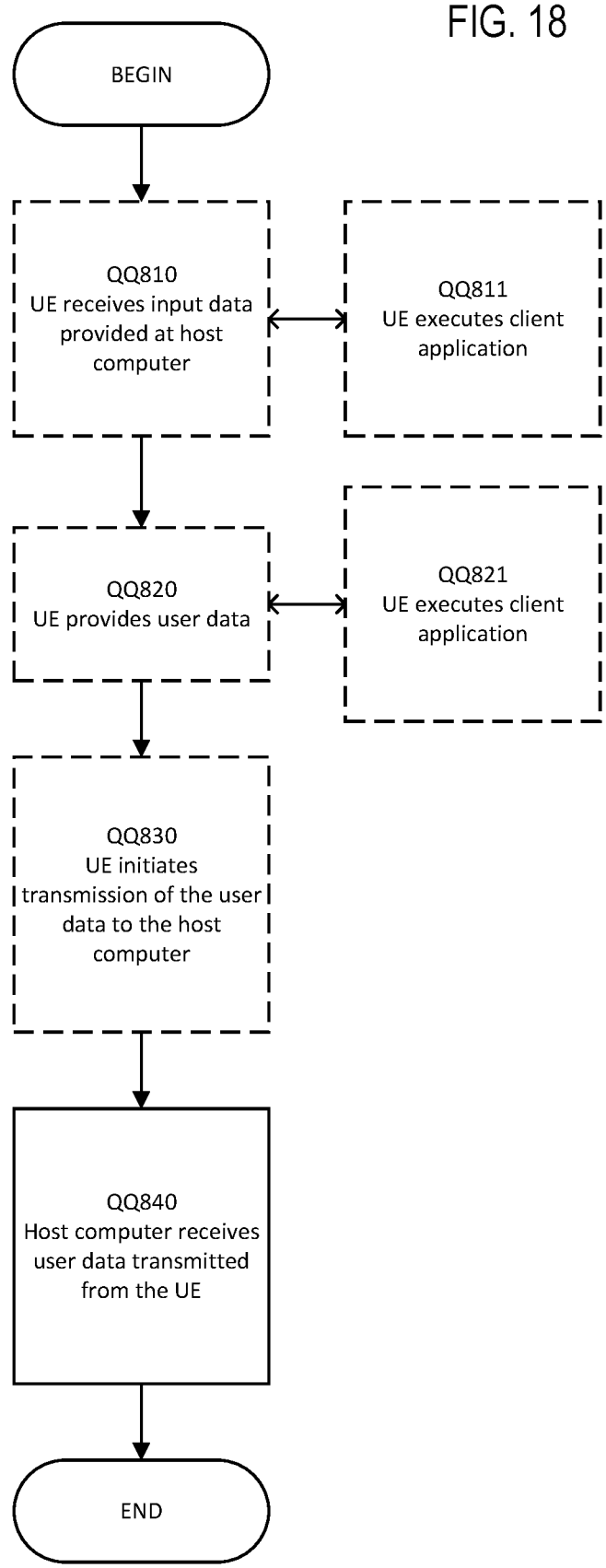
FIG. 18 is a block diagram of methods implemented in a communication system including a host computer, a base station, and a user equipment in accordance with some embodiments.

FIG. 18: Methods implemented in a communication system including a host computer, a base station and a user equipment in accordance with some embodiments.

FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 19:
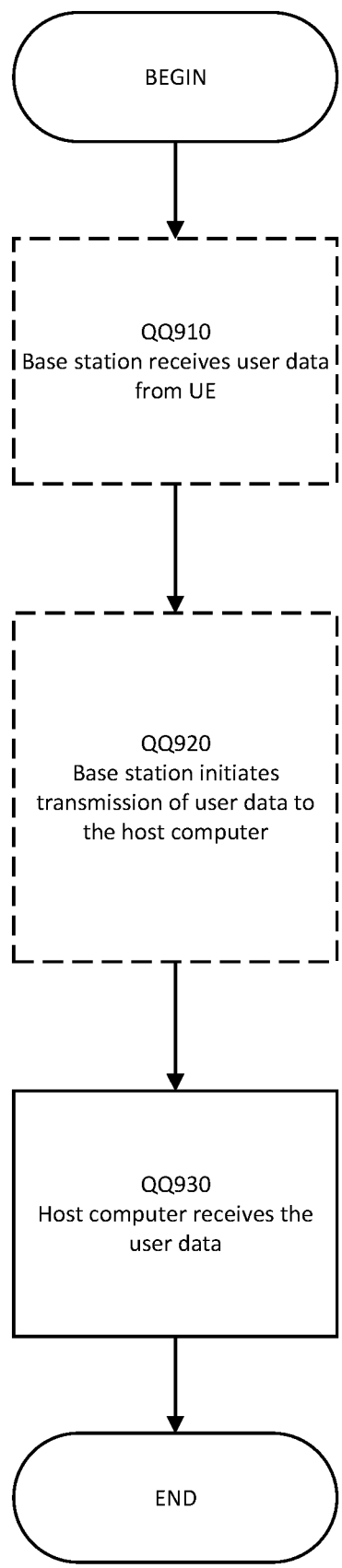
FIG. 19 is a block diagram of methods implemented in a communication system including a host computer, a base station, and a user equipment in accordance with some embodiments.

FIG. 19: Methods implemented in a communication system including a host computer, a base station and a user equipment in accordance with some embodiments.

FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Explanations for abbreviations from the above disclosure are provided below.

| Abbreviation | Explanation |
| --- | --- |
| 3GPP | 3$^{rd}$ Generation Partnership Project |
| 5G | 5$^{th}$ Generation Wireless Systems |
| NG | Next Generation |
| IoT | Internet of Things |
| AKA | Authentication and Key Agreement |
| UICC | Universal Integrated Circuit Card |
| SA2 | 3GPP architecture working group |
| SA3 | 3GPP security group |
| UP | User Plane |
| LTE | Long Term Evolution (4$^{th}$ Generation Wireless System) |
| CP | Control Plane |
| AS | Access Stratum |
| eNB | Evolved Node B |
| UE | User Equipment or End User Device |
| SMC | Security Mode Command |
| RRC | Radio Resource Control |
| PDCP | Packet Data Convergence Protocol |
| RAN | Radio Access Network |
| CN | Core Network |
| PDU | Packet Data Unit |
| DRB | Data Radio Bearer |
| AN | Access Network |
| (R)AN | Both 3GPP and non-3GPP Access Networks |
| NAS | Network Access Stratum |
| AMF | Access and Mobility Management Function |

-continued

| Abbreviation | Explanation |
| --- | --- |
| NF | Network Function |
| UDM | Unified Data Management |
| PCF | Policy Control Function |
| DRB-IP | Data Radio Bearer Integrity Protected |
| IE | Information Element |
| QoS | Quality of Service |

Citations for references from the above disclosure are provided below.

Reference [1]: 3GPP TS 23.501 V15.1.0 (2018-03), Technical Specification Group Services and System Aspects; System Architecture for the 5G System; Stage 2 (Release 15)

Reference [2]: 3GPP TS 33.501

Reference [3]: 3GPP TS 33.401

The invention claimed is:

1. A user equipment (UE) for handling security policy for user plane protection of communications in a communications system, the UE comprising:
a transceiver configured to transmit and receive through a wireless air interface with an access node (AN) of the communications system; and
at least one processor connected to the transceiver and configured to perform operations comprising:
transmitting through the transceiver a packet data unit (PDU) session establishment request network access stratum (NAS) message toward an Access and Mobility Management Function (AMF) to establish a PDU session;
receiving through the transceiver an AN specific resource setup message indicating whether the UE is to activate integrity protection for data radio bearers (DRBs) serving the PDU session;
summing DRB Integrity Protected (DRB-IP) rates that are allocated for the DRBs of the PDU session that are indicated by the AN specific resource setup message for the UE to activate integrity protection, to generate a session consumed DRB-IP rate; and
adjusting an available DRB-IP rate of the UE based on the session consumed DRB-IP rate.

2. The UE of claim 1, wherein
generation of the session consumed DRB-IP rate comprises not including in the summing any DRB-IP rates that are allocated for DRBs of the PDU session that are not indicated by the AN specific resource setup message for the UE to activate integrity protection.

3. The UE of claim 1, wherein:
when the PDU session will be the only active PDU session between the UE and the AN, the adjustment of the available DRB-IP rate of the UE comprises determining the available DRB-IP rate of the UE based on a difference between a maximum DRB-IP rate of the UE and the session consumed DRB-IP rate, wherein the maximum DRB-IP rate of the UE corresponds to a maximum computational capacity of the UE to process DRBs that are integrity protected during PDU sessions.

4. The UE of claim 1, further comprising:
before transmitting the PDU session establishment request NAS message toward the AMF and when the UE does not have an active PDU session with the AN which has DRBs for which the UE provides integrity protection, adding an indication of a maximum DRB-IP rate of the UE to the PDU session establishment request NAS message that is transmitted toward the AMF to establish a PDU session.

5. The UE of claim 1, wherein:
when the PDU session is one of a plurality of active PDU sessions between the UE and the AN, the adjustment of the available DRB-IP rate of the UE comprises determining the available DRB-IP rate of the UE based on a difference between a maximum DRB-IP rate of the UE and a summation of the session consumed DRB-IP rates that have been generated for each of the active PDU sessions, wherein the maximum DRB-IP rate of the UE corresponds to a maximum computational capacity of the UE to process DRBs that are integrity protected during PDU sessions.

6. The UE of claim 1, further comprising:
following the adjustment of the available DRB-IP rate of the UE, adding the available DRB-IP rate of the UE to another PDU session establishment request NAS message that is transmitted toward the AMF to establish another PDU session;
receiving through the transceiver another AN specific resource setup message indicating whether the UE is to activate integrity protection for DRBs serving the another PDU session;
summing DRB-IP rates that are allocated for the DRBs of the another PDU session that are indicated by the another AN specific resource setup message for the UE to activate integrity protection, to generate another session consumed DRB-IP rate; and
further adjusting the available DRB-IP rate of the UE based on a difference between the available DRB-IP rate of the UE and the another session consumed DRB-IP rate.

7. The UE of claim 1, further comprising:
responsive to releasing the PDU session, increasing the available DRB-IP rate of the UE based on the session consumed DRB-IP rate of the PDU session.

8. A method by a user equipment (UE) for handling security policy for user plane protection of communications in a communications system, the method comprising:
transmitting a packet data unit (PDU) session establishment request network access stratum (NAS) message toward an Access and Mobility Management Function (AMF) to establish a PDU session;
receiving an access node (AN) specific resource setup message indicating whether the UE is to activate integrity protection for data radio bearers (DRBs) serving the PDU session;
summing DRB Integrity Protected (DRB-IP) rates that are allocated for the DRBs of the PDU session that are indicated by the AN specific resource setup message for the UE to activate integrity protection, to generate a session consumed DRB-IP rate; and
adjusting an available DRB-IP rate of the UE based on the session consumed DRB-IP rate.

9. A communications system comprising:
an Access and Mobility Management Function (AMF) of the communications system, the AMF comprising:
a network interface configured to communicate with user equipments (UEs) via a network and an access node (AN) of the communications system, and to communicate with a Session Management Function (SMF) of the communications system; and
at least one processor configured to perform operations comprising:
receiving a packet data unit (PDU) session establishment request network access stratum (NAS) message from a UE requesting establishment of a PDU session, the PDU session establishment request NAS message comprising an indication of an available data radio bearer integrity protected (DRB-IP) rate for which the UE presently has available computational capacity for processing DRBs that are integrity protected for the PDU session being established;
communicating toward the SMF a PDU session create message containing the indication of the available DRB-IP rate;
receiving a SMF message containing an indication of a user plane (UP) security policy for a PDU session being established; and
communicating a message containing the indication of the UP security policy to an access node (AN) that is communicating through a wireless air interface with the UE; and
the UE comprising:
a transceiver configured to transmit and receive through a wireless air interface with an access node (AN) of the communications system; and
at least one processor connected to the transceiver and configured to perform operations comprising:
receiving through the transceiver an AN specific resource setup message indicating whether the UE is to activate integrity protection for data radio bearers (DRBs) serving the PDU session;
summing DRB Integrity Protected (DRB-IP) rates that are allocated for the DRBs of the PDU session that are indicated by the AN specific resource setup message for the UE to activate integrity protection, to generate a session consumed DRB-IP rate; and
adjusting an available DRB-IP rate of the UE based on the session consumed DRB-IP rate.

10. A method by a communications system, the method comprising:
at an Access and Mobility Management Function (AMF):
receiving a packet data unit (PDU) session establishment request network access stratum (NAS) message from a user equipment (UE) requesting establishment of a PDU session, the PDU session establishment request NAS message comprising an indication of an available data radio bearer integrity protected (DRB-IP) rate for which the UE presently has available computational capacity for processing DRBs that are integrity protected for the PDU session being established;
communicating toward a Session Management Function (SMF) a PDU session create message containing the indication of the available DRB-IP rate of the UE;
receiving a SMF message containing an indication of a user plane (UP) security policy for a PDU session being established; and
communicating a message containing the indication of the UP security policy to an access node (AN) that is communicating through a wireless air interface with the UE; and
at the UE:
receiving an access node (AN) specific resource setup message indicating whether the UE is to activate integrity protection for data radio bearers (DRBs) serving the PDU session;

summing DRB Integrity Protected (DRB-IP) rates that are allocated for the DRBs of the PDU session that are indicated by the AN specific resource setup message for the UE to activate integrity protection, to generate a session consumed DRB-IP rate; and adjusting an available DRB-IP rate of the UE based on the session consumed DRB-IP rate.

11. A communications system comprising:

a Session Management Function (SMF) of the communications system, the SMF comprising:

a network interface configured to communicate with an Access and Mobility Management Function (AMF) of the communications system; and at least one processor configured to perform operations comprising:

receiving from the AMF a packet data unit (PDU) session create message for a user equipment (UE) that is requesting establishment of a PDU session, the PDU session create message containing an indication of an available data radio bearer integrity protected (DRB-IP) rate for which the UE presently has available capacity for processing DRBs that are integrity protected for the PDU session being established;

determining a user plane (UP) security policy for the PDU session based on the indication of the available DRB-IP rate for which the UE presently has available capacity; and communicating to the AMF a message containing an indication of the UP security policy for the PDU session being established; and the UE comprising:

a transceiver configured to transmit and receive through a wireless air interface with an access node (AN) of the communications system; and at least one processor connected to the transceiver and configured to perform operations comprising:

receiving through the transceiver an AN specific resource setup message indicating whether the UE is to activate integrity protection for data radio bearers (DRBs) serving the PDU session;

summing DRB Integrity Protected (DRB-IP) rates that are allocated for the DRBs of the PDU session that are indicated by the AN specific resource setup message for the UE to activate integrity protection, to generate a session consumed DRB-IP rate; and adjusting an available DRB-IP rate of the UE based on the session consumed DRB-IP rate.

12. The SMF of claim 11, wherein the determination of the UP security policy for the PDU session comprises determining whether the UE is to actively use integrity protection for at least some of the DRBs the UE will use for communication in the PDU session being established.

13. A method by a communications system, the method comprising:

a Session Management Function (SMF):

receiving from an Access and Mobility Management Function (AMF) a packet data unit (PDU) session create message for a user equipment (UE) that is requesting establishment of a PDU session, the PDU session create message containing an indication of an available data radio bearer integrity protected (DRB-IP) rate for which the UE presently has available capacity for processing DRBs that are integrity protected for the PDU session being established;

determining a user plane (UP) security policy for the PDU session based on the indication of the available DRB-IP rate for which the UE presently has available capacity; and communicating to the AMF a message containing an indication of the UP security policy for the PDU session being established; and at the UE:

receiving an access node (AN) specific resource setup message indicating whether the UE is to activate integrity protection for data radio bearers (DRBs) serving the PDU session;

summing DRB Integrity Protected (DRB-IP) rates that are allocated for the DRBs of the PDU session that are indicated by the AN specific resource setup message for the UE to activate integrity protection, to generate a session consumed DRB-IP rate; and adjusting an available DRB-IP rate of the UE based on the session consumed DRB-IP rate.

14. The method of claim 13, wherein the determination of the UP security policy for the PDU session comprises determining whether the UE is to actively use integrity protection for at least some of the DRBs the UE will use for communication in the PDU session being established.

* * * * *

UNITED STATES PATENT AND TRADEMARK OFFICE
CERTIFICATE OF CORRECTION

PATENT NO. : 12,200,491 B2  
APPLICATION NO. : 16/619268  
DATED : January 14, 2025  
INVENTOR(S) : Ben Henda et al.

Page 1 of 2

It is certified that error appears in the above-identified patent and that said Letters Patent is hereby corrected as shown below:

In the Drawings

In Fig. 11, Sheet 9 of 17, for Tag "QQ172", Line 1, delete "Tranceiver" and insert -- Transceiver --, therefor.

In Fig. 11, Sheet 9 of 17, delete "QQ170 Wireless Signal".

In Fig. 11, Sheet 9 of 17, for Tag "QQ116", Line 2, delete "Amplifier(S)" and insert -- Amplifier(s) --, therefor.

In Fig. 11, Sheet 9 of 17, for Tag "QQ118", Line 1, delete "Filter(S)" and insert -- Filter(s) --, therefor.

In Fig. 11, Sheet 9 of 17, for Tag "QQ122", Line 2, delete "Tranceiver" and insert -- Transceiver --, therefor.

In the Specification

In Column 1, Lines 5-6, delete "PCT/SE2019/058622" and insert -- PCT/EP2019/058622 --, therefor.

In Column 2, Line 37, delete "include among" and insert -- include --, therefor.

In Column 3, Line 21, delete "resulting" and insert -- resulting in --, therefor.

In Column 8, Line 48, delete "FIG. 8" and insert -- FIG. 8. --, therefor.

In Column 9, Line 56, delete "can" and insert -- can be --, therefor.

In Column 23, Line 25, delete "QQ190" and insert -- QQ192 --, therefor.

In Column 23, Line 30, delete "GHZ." and insert -- GHz. --, therefor.

Signed and Sealed this  
Twenty-sixth Day of August, 2025

Coke Morgan Stewart  
*Acting Director of the United States Patent and Trademark Office*

CERTIFICATE OF CORRECTION (continued)
U.S. Pat. No. 12,200,491 B2

In Column 24, Line 36, delete "(VOIP)" and insert -- (VoIP) --, therefor.

In Column 24, Line 61, delete "etc.)" and insert -- etc.), --, therefor.

In Column 25, Line 32, delete "QQ114" and insert -- QQ112 --, therefor.

In Column 28, Line 17, delete "QQ2200" and insert -- QQ200 --, therefor.

In Column 28, Line 25, delete "term" and insert -- terms --, therefor.

In Column 28, Line 26, delete "interchangeable." and insert -- interchangeably. --, therefor.

In Column 28, Line 35, delete "QQ233," and insert -- QQ213, --, therefor.

In Column 31, Line 46, delete "QQ390. Memory QQ390" and insert -- QQ390-1. Memory QQ390-1 --, therefor.

In Column 35, Line 56, delete "QQ510's" and insert -- QQ510 --, therefor.

In Column 37, Line 32, delete "according" and insert -- according to --, therefor.